United States Patent
Naito et al.

(10) Patent No.: US 11,676,095 B2
(45) Date of Patent: Jun. 13, 2023

(54) DEVICE FOR DETERMINING POSITION TO UNLOAD PARCEL FROM AUTONOMOUS VEHICLE FOR DELIVERY, METHOD, AUTONOMOUS VEHICLE, AND SYSTEM

(71) Applicant: Panasonic Intellectual Property Corporation of America, Torrance, CA (US)

(72) Inventors: Eiichi Naito, Kyoto (JP); Takenobu Aoshima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1118 days.

(21) Appl. No.: 16/362,449

(22) Filed: Mar. 22, 2019

(65) Prior Publication Data

US 2019/0220811 A1 Jul. 18, 2019

Related U.S. Application Data

(63) Continuation of application No. PCT/JP2018/003945, filed on Feb. 6, 2018.

(30) Foreign Application Priority Data

Mar. 27, 2017 (JP) .............................. JP2017-060770
Nov. 20, 2017 (JP) .............................. JP2017-222564

(51) Int. Cl.
*G06Q 10/0832* (2023.01)
*B60P 1/02* (2006.01)
(Continued)

(52) U.S. Cl.
CPC ............ *G06Q 10/0832* (2013.01); *B60P 1/02* (2013.01); *B65G 67/24* (2013.01); *G05D 1/0088* (2013.01);
(Continued)

(58) Field of Classification Search
CPC .............................. G06Q 10/0832; B60P 1/02
(Continued)

(56) References Cited

U.S. PATENT DOCUMENTS 9,256,852 B1    2/2016  Myllymaki
11,222,299 B1 *  1/2022  Baalke ................. G06Q 10/087
(Continued)

FOREIGN PATENT DOCUMENTS

EP   E P-2944512 A1 * 11/2015 ......... A47G 29/1209
JP   2002-265062       9/2002
JP   2014-189361 A    10/2014

OTHER PUBLICATIONS

Liu, Jiachao. "Optimal curbside pricing for managing ride-hailing pick-ups and drop-offs" Transportation Research Part C: Emerging Technologies, vol. 146, https://www.sciencedirect.com/science/article/pii/S0968090X22003734 (Year: 2023).*

(Continued)

*Primary Examiner* — Shannon S Campbell
*Assistant Examiner* — Lisa Ma
(74) *Attorney, Agent, or Firm* — Greenblum & Bernstein, P.L.C.

(57) ABSTRACT

A device includes a processor and memory storing a computer program that causes the processor to perform operations including (A) acquiring an address indicating a delivery destination of a package, and first attribute information indicating an attribute of a stopping position where an autonomous vehicle delivering the package stops at the delivery destination, (B) determining a side from which the package is to be unloaded at the delivery destination, out of a plurality of sides of the autonomous vehicle, based on the address and the first attribute information, and (C) output-
(Continued)

ting management information in which identification information for identifying the package is associated with the determined side.

20 Claims, 22 Drawing Sheets

(51) Int. Cl.
| | |
|---|---|
| *G05D 1/00* | (2006.01) |
| *B65G 67/24* | (2006.01) |
| *G06Q 10/0835* | (2023.01) |
| *G05D 1/02* | (2020.01) |
| *G06Q 50/30* | (2012.01) |
| *G06Q 10/08* | (2023.01) |

(52) U.S. Cl.
CPC ........... *G05D 1/0225* (2013.01); *G06Q 10/08* (2013.01); *G06Q 10/08355* (2013.01); *G06Q 50/30* (2013.01); *G05D 2201/0213* (2013.01)

(58) Field of Classification Search
USPC ....................................................... 701/423
See application file for complete search history.

(56) References Cited

U.S. PATENT DOCUMENTS

| | | | | |
|---|---|---|---|---|
| 2013/0297066 | A1* | 11/2013 | Alvern | G07F 9/002 700/232 |
| 2014/0081517 | A1* | 3/2014 | Barrett | B60K 35/00 701/36 |
| 2015/0347959 | A1 | 12/2015 | Skaaksrud | |
| 2018/0136656 | A1* | 5/2018 | Rasmusson, Jr. | G01C 21/3638 |
| 2018/0202822 | A1* | 7/2018 | DeLizio | B60R 25/24 |
| 2019/0043370 | A1* | 2/2019 | Mulhall | G08G 5/0026 |
| 2019/0113935 | A1* | 4/2019 | Kuo | G05B 19/4155 |
| 2019/0213541 | A1* | 7/2019 | Dautz | B65G 67/04 |
| 2020/0172089 | A1* | 6/2020 | Dyer | G05D 1/0221 |
| 2020/0209865 | A1* | 7/2020 | Jarvis | B66F 9/063 |
| 2021/0380135 | A1* | 12/2021 | Kanitz | G01C 21/3484 |
| 2022/0119210 | A1* | 4/2022 | Felton | B65G 1/0435 |

OTHER PUBLICATIONS

The Extended European Search Report dated Jul. 22, 2019 for the related European Patent Application No. 18776861.9.
International Search Report of PCT application No. PCT/JP2018/003945 dated Apr. 17, 2018.

* cited by examiner

FIG. 9

| PACKAGE | ADDRESS | RECIPIENT |
|---------|---------|-----------|
| B1 | A1 | R1 |
| B2 | A2 | R2 |
| B3 | A3 | R3 |
| : | : | : |

FIG. 10

| LOCKER | LOCKER ORIENTATION | LOCKER HEIGHT |
|--------|--------------------|---------------|
| L1 | LEFT | HIGH |
| L2 | REAR | MIDDLE |
| L3 | RIGHT | LOW |
| : | : | : |

FIG. 11

| ADDRESS | STOPPING POSITION | STOPPING POSITION ATTRIBUTES |
|---------|-------------------|------------------------------|
| A1 | x1, y1 | HEAVY TRAFFIC |
| A2 | x2, y2 | STOP BACKWARDS |
| A3 | x3, y3 | OBSTRUCTION TO LEFT SIDE |
| : | : | : |

FIG. 12

| STOPPING POSITION ATTRIBUTES | UNLOADING ORIENTATION | ORIENTATION APPROPRIATENESS |
|---|---|---|
| HEAVY TRAFFIC | LEFT | 1.0 |
| HEAVY TRAFFIC | REAR | 0.7 |
| HEAVY TRAFFIC | RIGHT | 0.3 |
| STOP BACKWARDS | LEFT | 0.5 |
| STOP BACKWARDS | REAR | 1.0 |
| STOP BACKWARDS | RIGHT | 0.8 |
| OBSTRUCTION TO LEFT SIDE | LEFT | 0.0 |
| OBSTRUCTION TO LEFT SIDE | REAR | 0.8 |
| OBSTRUCTION TO LEFT SIDE | RIGHT | 1.0 |
| : | : | : |

FIG. 13

| ADDRESS | UNLOADING ORIENTATION | ORIENTATION APPROPRIATENESS |
|---|---|---|
| A1 | LEFT | 1.0 |
| A1 | REAR | 0.7 |
| A1 | RIGHT | 0.3 |
| A2 | LEFT | 0.5 |
| A2 | REAR | 1.0 |
| A2 | RIGHT | 0.8 |
| A3 | LEFT | 0.0 |
| A3 | REAR | 0.8 |
| A3 | RIGHT | 1.0 |
| ⋮ | ⋮ | ⋮ |

FIG. 14

| PACKAGE | LOCKER | ORIENTATION APPROPRIATENESS |
|---|---|---|
| B1 | L1 | 1.0 |
| B1 | L2 | 0.7 |
| B1 | L3 | 0.3 |
| B1 | : | : |
| B2 | L1 | 0.5 |
| B2 | L2 | 1.0 |
| B2 | L3 | 0.8 |
| : | : | : |

FIG. 15

| RECIPIENT | RECIPIENT ATTRIBUTES |
|---|---|
| R1 | NORMAL |
| R2 | AGED |
| R3 | HANDICAPPED |
| : | : |

FIG. 16

| RECIPIENT ATTRIBUTES | LOCKER HEIGHT | HEIGHT APPROPRIATENESS |
|---|---|---|
| NORMAL | HIGH | 1.0 |
| NORMAL | MIDDLE | 0.9 |
| NORMAL | LOW | 0.8 |
| AGED | HIGH | 0.3 |
| AGED | MIDDLE | 1.0 |
| AGED | LOW | 0.9 |
| VISUALLY IMPAIRED | HIGH | 0.0 |
| VISUALLY IMPAIRED | MIDDLE | 0.2 |
| VISUALLY IMPAIRED | LOW | 1.0 |
| : | : | : |

FIG. 17

| RECIPIENT | LOCKER HEIGHT | HEIGHT APPROPRIATENESS |
|---|---|---|
| R1 | HIGH | 1.0 |
| R1 | MIDDLE | 0.9 |
| R1 | LOW | 0.8 |
| R2 | HIGH | 0.3 |
| R2 | MIDDLE | 1.0 |
| R2 | LOW | 0.9 |
| R3 | HIGH | 0.0 |
| R3 | MIDDLE | 0.2 |
| R3 | LOW | 1.0 |
| ⋮ | ⋮ | ⋮ |

FIG. 18

| PACKAGE | LOCKER | HEIGHT APPROPRIATENESS |
|---|---|---|
| B1 | L1 | 1.0 |
| B1 | L2 | 0.9 |
| B1 | L3 | 0.8 |
| B1 | : | : |
| B2 | L1 | 0.3 |
| B2 | L2 | 1.0 |
| B2 | L3 | 0.9 |
| : | : | : |

FIG. 19

| PACKAGE | LOCKER | LOADING APPROPRIATENESS |
|---|---|---|
| B1 | L1 | 1.0 |
| B1 | L2 | 0.7 |
| B1 | L3 | 0.3 |
| B1 | : | : |
| B2 | L1 | 0.3 |
| B2 | L2 | 1.0 |
| B2 | L3 | 0.8 |
| : | : | : |

FIG. 20

| PACKAGE | LOCKER |
|---------|--------|
| B1 | L1 |
| B2 | L2 |
| B3 | L8 |
| B4 | L17 |
| B5 | L6 |
| B6 | L13 |
| B7 | L21 |
| : | : |

DEVICE FOR DETERMINING POSITION TO UNLOAD PARCEL FROM AUTONOMOUS VEHICLE FOR DELIVERY, METHOD, AUTONOMOUS VEHICLE, AND SYSTEM

BACKGROUND

1. Technical Field

The present disclosure relates to a position determining device and a position determining method for determining an unloading position of packages from an autonomous vehicle from which packages can be unloaded from multiple unloading positions, an autonomous vehicle from which packages can be unloaded from multiple unloading positions, and a position determining system having the autonomous vehicle and the position determining device.

2. Description of the Related Art

As of recent, technology has been developed regarding completely autonomous vehicles (self-driving automobiles) that do not need operations by a driver, and conceptualization and implementation experimentation of home delivery by unmanned delivery vehicles is being performed using such autonomous vehicles.

For example, U.S. Pat. No. 9,256,852 discloses an autonomous vehicle that receives destination information and travels to a destination based on the destination information, a package securing subsystem being attached thereto and including at least one securable compartment. Each securable compartment secures at least one package within and is associated with compartment access information, and the access subsystem includes at least one access information interface. Upon receiving compartment access information by the access information interface, the access subsystem permits access to the compartment associated with the received compartment access information.

Japanese Unexamined Patent Application Publication No. 2002-265062 also describes a load loading position management method with regard to a loading method of packages in a manned delivery vehicle where, for example, a product tag readably storing package information including the size or transport temperature of the package is created, the package information stored in the product tag is read from the package to which the product tag is attached when loading in a delivery vehicle, a position for loading in the cargo space of the delivery vehicle is judged, and the loading position is displayed to instruct delivery staff.

SUMMARY

In one general aspect, the techniques disclosed here feature a device including a processor and memory storing a computer program that causes the processor to perform operations including (A) acquiring an address indicating a delivery destination of a package, and first attribute information indicating an attribute of a stopping position where an autonomous vehicle delivering the package stops at the delivery destination, (B) determining a side from which the package is to be unloaded at the delivery destination, out of a plurality of sides of the autonomous vehicle, based on the address and the first attribute information, and (C) outputting management information in which identification information for identifying the package is associated with the determined side.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually acquired by the various embodiments and features of the specification and drawings, which need not all be provided in order to acquire one or more of such benefits and/or advantages.

BRIEF DESCRIPTION OF THE DRAWINGS

FIG. 9 is a diagram illustrating an example of a package table stored in a package database illustrated in FIG. 8;

FIG. 10 is a diagram illustrating an example of a moving body locker table stored in a moving body locker database illustrated in FIG. 8;

FIG. 11 is a diagram illustrating an example of a stopping position attributes table stored in a stopping position attributes database illustrated in FIG. 8;

FIG. 12 is a diagram illustrating an example of a stopping position attributes/orientation appropriateness table stored in the stopping position attributes database illustrated in FIG. 8;

FIG. 13 is a diagram illustrating an example of an address/orientation appropriateness table;

FIG. 14 is a diagram illustrating an example of a package orientation appropriateness table;

FIG. 15 is a diagram illustrating an example of a recipient attributes table stored in a recipient attributes database illustrated in FIG. 8;

FIG. 16 is a diagram illustrating an example of a recipient attributes/height appropriateness table stored in the recipient attributes database illustrated in FIG. 8;

FIG. 17 is a diagram illustrating an example of a recipient/height appropriateness table;

FIG. 18 is a diagram illustrating an example of a package height appropriateness table;

FIG. 19 is a diagram illustrating an example of a loading appropriateness table;

FIG. 20 is a diagram illustrating an example of a loading instruction table;

DETAILED DESCRIPTION

Figure 1:
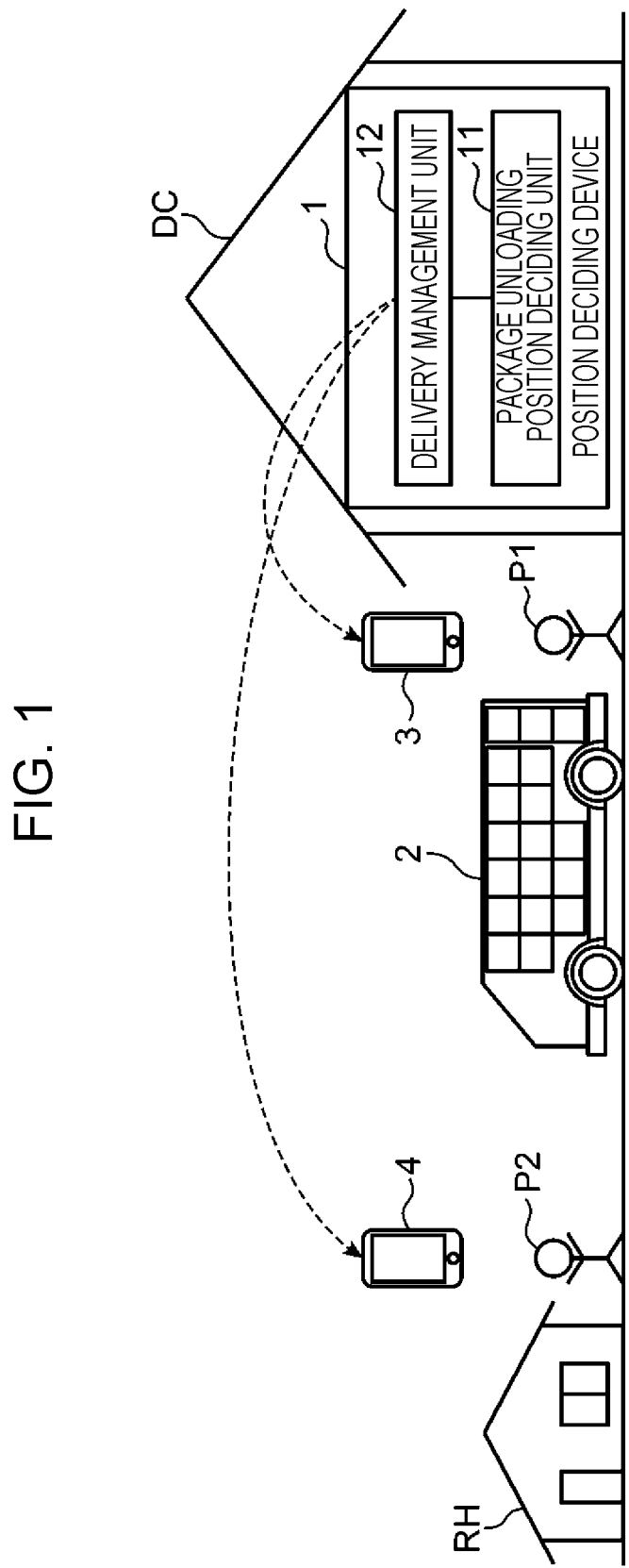
FIG. 1 is a schematic diagram illustrating an example of the configuration of a position determining system according to a first embodiment of the present disclosure.

Underlying Knowledge Forming Basis of the Present Disclosure

The autonomous vehicle described in the aforementioned U.S. Pat. No. 9,256,852 has multiple lockers (sections) for storing packages laid out in a lattice form, with multiple lockers being laid out in the horizontal direction at each height of upper tier, middle tier, and lower tier. In a case where the height-wise positions of the lockers differ, it will be difficult for a short recipient or a handicapped person in a wheelchair to unload packages stored in the upper tier lockers.

In a case where multiple lockers are laid out on the left-side face, right-side face, and rear face of the autonomous vehicle to increase the amount that can be loaded in the autonomous vehicle, the following problem occurs with respect to the side of the road on which vehicles travel. In the present specification, description has been made assuming a region where vehicles travel on the left side of the road. Naturally, in regions where vehicles travel on the right side of the road, the left and right in the description would be inverted. Now, for example, in a case where the package receiving site is a site where traffic is heavy, if packages are stored on the right-side face of the autonomous vehicle, the packages cannot be safely unloaded since other automobiles are traveling on the right side of the autonomous vehicle. Also, in a case where there is a fence, ditch, or some other like obstruction on the left side of the location where the autonomous vehicle is stopped where packages are to be received, and packages are stored in lockers to the left left-side face of the autonomous vehicle, the obstruction prevents packages from being easily unloaded.

In other to solve the above problems, there is a need to determine the package unloading positions of the autonomous vehicle where packages can be unloaded, out of the multiple unloading positions, in accordance with attributes (characteristics) of package unloading sites and package recipients. Based on this understanding, the Present Inventors diligently studied how to determine package unloading positions of an autonomous vehicle from which packages can be unloaded from multiple unloading positions, in accordance with attributes of package unloading sites and package recipients, and thus have completed the present disclosure.

A position determining device according to an aspect of the present disclosure is a position determining device that determines an unloading position of a package from an autonomous vehicle from which a package can be unloaded from multiple unloading positions. The position determining device includes: an acquiring unit that acquires a delivery destination address of the package, and stopping position attributes information indicating attributes of a stopping position where the autonomous vehicle stops to deliver the package to that address; a determining unit that determines an orientation of the unloading position of the package, based on the stopping position attributes information correlated with the delivery destination address of the package; and an output unit that outputs management information that manages the package and the orientation of the unloading position of the package in a correlated manner.

According to this configuration, the delivery destination address of the package, and stopping position attributes information indicating attributes of a stopping position where the autonomous vehicle stops to deliver the package to the address, are acquired, the orientation of the unloading position of the package is determined based on the stopping position attributes information correlated with the delivery destination address of the package, and management information is output that manages the package and the orientation of the unloading position of the package in a correlated manner. Accordingly, by loading the package to the autonomous vehicle in accordance with this management information, the orientation of the unloading position is an orientation appropriate for attributes of the stopping position, and in a case where an unmanned autonomous vehicle is used to deliver the package, an unloading orientation can be determined that is appropriate for the reception site of the package, and the recipient can easily unload the package.

The stopping position attributes information may include at least one of traffic amount information relating to the amount of traffic at the stopping position, lane count information relating to a count of lanes of a road at the stopping position, stopping orientation information relating to a stopping orientation of the autonomous vehicle, and obstruction information relating to obstructions in the vicinity of the stopping position.

According to this configuration, the stopping position attributes information includes at least one of traffic amount information relating to the amount of traffic at the stopping position, lane count information relating to a count of lanes of a road at the stopping position, stopping orientation information relating to a stopping orientation of the autonomous vehicle, and obstruction information relating to obstructions in the vicinity of the stopping position, so the orientation of the unloading position of the package can be made to be an orientation appropriate for the amount of traffic at the stopping position, an orientation appropriate for the count of lanes of the road at the stopping position, an orientation appropriate for the stopping orientation of the autonomous vehicle, and an orientation appropriate for obstructions in the vicinity of the stopping position, and the recipient can unload the package easily and safely.

The stopping position attributes information may include traffic amount information relating to the amount of traffic at the stopping position, and in a case where the delivery destination address of the package is correlated with the traffic amount information indicating an amount of traffic of vehicles heavier than a predetermined amount, the determining unit may determine the unloading position orientation of the package to be on a side of the autonomous vehicle that is opposite from a center line of the road.

According to this configuration, in a case where the delivery destination address of the package is correlated with the traffic amount information indicating the amount of traffic heavier than a predetermined amount, the unloading position orientation of the package is determined to be on a side of the autonomous vehicle that is opposite from a center line of the road, so the package can be easily and safely unloaded from the side where other automobiles are not traveling.

The stopping position attributes information may include lane count information relating to a count of lanes of a road at the stopping position, and in a case where the delivery destination address of the package is correlated with the lane count information indicating two lanes or more on each side of the road, the determining unit may determine the unloading position orientation of the package to be a side of the autonomous vehicle that is closer to the edge of the road.

According to this configuration, in a case where the delivery destination address of the package is correlated with the lane count information indicating two lanes or more on each side of the road, the unloading position orientation of the package is determined to be a side of the autonomous vehicle that is closer to the edge of the road, so the autonomous vehicle stops at the outermost side of the vehicle passage zone, and the package can be easily and safely unloaded from the side where other automobiles are not traveling.

The stopping position attributes information may include stopping orientation information relating to a stopping orientation of the autonomous vehicle, and in a case where the delivery destination address of the package is correlated with stopping orientation information indicating stopping backwards, the determining unit may determine the unloading position orientation of the package to be at a rear side of the autonomous vehicle.

According to this configuration, in a case where the delivery destination address of the package is correlated with stopping orientation information indicating stopping backwards, the unloading position orientation of the package is determined to be at a rear side of the autonomous vehicle, so the autonomous vehicle is stopped backwards, so the package can be easily and safely unloaded from the rear side of the autonomous vehicle.

The stopping position attributes information may include obstruction information relating to obstructions in the vicinity of the stopping position, and in a case where the delivery destination address of the package is correlated with obstruction information indicating that there is an obstruction in the vicinity, the determining unit may determine the unloading position orientation of the package to be at a side where the obstruction is not present.

According to this configuration, in a case where the delivery destination address of the package is correlated with obstruction information indicating that there is an obstruction in the vicinity, the unloading position orientation of the package is determined to be at a side where the obstruction is not present, so the package can be easily and safely unloaded from the side where there is no obstruction.

The acquiring unit may acquire delivery destination addresses for each of the multiple packages, and stopping position attributes information indicating attributes of the stopping position where the autonomous vehicle stops to deliver the package to that address, and the determining unit may calculate, for each package, an orientation appropriateness representing a degree of ease of unloading that package with regard to each orientation of the multiple unloading positions, based on the stopping position attributes information correlated with each delivery destination address of the multiple packages, and determine the orientation of the unloading position of each of the multiple packages based on the orientation appropriateness.

According to this configuration, delivery destination addresses for each of the multiple packages, and stopping position attributes information indicating attributes of the stopping position where the autonomous vehicle stops to deliver the package to the address, are acquired, an orientation appropriateness representing a degree of ease of unloading that package with regard to each orientation of the multiple unloading positions is calculated, for each package, based on the stopping position attributes information correlated with each delivery destination address of the multiple packages, and the orientation of the unloading position of each of the multiple packages is determined based on the orientation appropriateness, so the orientations for unloading positions of each of multiple packages can be determined to be orientations appropriate for attributes of the stopping position.

The acquiring unit may acquire recipient identification information identifying a recipient of the package, and recipient attributes information indicating attributes of the recipient, the determining unit may determine a height of the unloading position of the package based on the recipient attributes information correlated with the recipient identification information, and the output unit may output management information which manages the package and the height of the unloading position of the package in a correlated manner.

According to this configuration, recipient identification information identifying a recipient of the package, and recipient attributes information indicating attributes of the recipient, are acquired, a height of the unloading position of the package is determined based on the recipient attributes information correlated with the recipient identification information, and management information which manages the package and the height of the unloading position of the package in a correlated manner is output, so by loading packages in the autonomous vehicle in accordance with this management information, the height of the unloading position is a height appropriate for attributes of the recipient. In a case of delivering packages using the unmanned autonomous vehicle, a package unloading position height can be determined that is appropriate for the recipient, and the recipient can unload packages with ease.

The recipient attributes information may include at least one of height information relating to the height of the recipient, age information relating to the age of the recipient, and handicap information relating to whether the recipient is handicapped or not.

According to this configuration, the recipient attributes information includes at least one of height information relating to the height of the recipient, age information relating to the age of the recipient, and handicap information relating to whether the recipient is handicapped or not, so the height of the unloading position of the package can be made to be a height appropriate for the height of the recipient, be a height appropriate for the age of the recipient, or be a height appropriate for whether the recipient is handicapped or not, and the recipient can easily unload the package.

The recipient attributes information may include height information relating to the height of the recipient, and in a case where the height information indicates that the height of the recipient is lower than a predetermined value, the determining unit may determine the height of the unloading position of the package to be a position lower than a predetermined middle position.

According to this configuration, in a case where the height information indicates that the height of the recipient is lower than a predetermined value, the height of the unloading position of the package is determined to be a position lower than a predetermined middle position, so a short recipient can easily unload the package from a low unloading position.

The recipient attributes information may include age information relating to the age of the recipient, and in a case where the age information indicates that the age of the recipient is above a predetermined value, the determining unit may determine the height of the unloading position of the package to be a position lower than a predetermined middle position.

According to this configuration, in a case where the age information indicates that the age of the recipient is above a predetermined value, the height of the unloading position of the package is determined to be a position lower than a predetermined middle position, so an elderly recipient can easily unload the package from a low unloading position.

The recipient attributes information may include handicap information relating to whether the recipient is handicapped or not, and in a case where the handicap information indicates that the recipient is handicapped, the determining unit may determine the height of the unloading position of the package to be a position lower than a predetermined middle position.

According to this configuration, in a case where the handicap information indicates that the recipient is handicapped, the height of the unloading position of the package is determined to be a position lower than a predetermined middle position, so a handicapped person in a wheelchair can easily unload the package from a low unloading position.

The acquiring unit may acquire recipient identification information identifying each recipient of multiple packages, and recipient attributes information indicating attributes of the recipients, wherein the determining unit may calculate, for each of the packages, height appropriateness representing a degree of ease of unloading the package with regard to each height of the multiple unloading positions, based on the recipient attributes information correlated with the recipient identification information identifying each of the recipients of the multiple packages, and determine the height of the unloading position for each of the multiple packages based on the height appropriateness.

According to this configuration, recipient identification information identifying each recipient of multiple packages and recipient attributes information indicating attributes of the recipients are acquired, height appropriateness representing a degree of ease of unloading the package is calculated for each of the packages, with regard to each height of the multiple unloading positions, based on the recipient attributes information correlated with the recipient identification information identifying each of the recipients of the multiple packages, and the height of the unloading position for each of the multiple packages is determined based on the height appropriateness, so the height of unloading position for each of multiple packages can be determined to a height appropriate for the attributes of the recipient.

The acquiring unit may acquire delivery destination addresses for each of multiple packages and the stopping position attributes information indicating attributes of stopping positions where the autonomous vehicle stops to deliver the packages to those addresses, and also acquire recipient identification information identifying each recipient of the multiple packages and recipient attributes information indicating attributes of those recipients. The determining unit may calculate, for each of the packages, an orientation appropriateness representing a degree of ease of unloading that package with regard to each orientation of the multiple unloading positions, based on the stopping position attributes information correlated with each delivery destination address of the multiple packages, calculate, for each of the packages, height appropriateness representing a degree of ease of unloading the package with regard to each height of the multiple unloading positions, based on the recipient attributes information correlated with the recipient identification information identifying each of the recipients of the multiple packages, calculate, for each of the packages, unloading appropriateness representing a degree of ease of unloading that package at each of the multiple unloading position, based on the calculated orientation appropriateness and height appropriateness, and determine the orientation and height of the unloading position for each of the multiple packages based on the unloading appropriateness.

According to this configuration, delivery destination addresses is acquired for each of multiple packages and the stopping position attributes information indicating attributes of stopping positions where the autonomous vehicle stops to deliver the packages to the addresses, and recipient identification information identifying each recipient of the multiple packages and recipient attributes information indicating attributes of the recipients may also be acquired. An orientation appropriateness representing a degree of ease of unloading that package with regard to each orientation of the multiple unloading positions is calculated, for each of the packages, based on the stopping position attributes information correlated with each delivery destination address of the multiple packages, height appropriateness representing a degree of ease of unloading the package with regard to each height of the multiple unloading positions is calculated, for each of the packages, based on the recipient attributes information correlated with the recipient identification information identifying each of the recipients of the multiple packages, unloading appropriateness representing a degree of ease of unloading that package at each of the multiple unloading position is calculated, for each of the packages, based on the calculated orientation appropriateness and height appropriateness and the orientation and height of each of the multiple packages is determined based on the calculated unloading appropriateness. Accordingly, the orientation of unloading positions of each of multiple packages can be determined to be an orientation appropriate for stopping position attributes, and the height of unloading positions of each of multiple packages can be determined to be a height appropriate for recipient attributes.

Also, the present disclosure is not restricted to being realized as a position determining device having the characteristic configurations above, and can be realized as a position determining method where characteristic processing, corresponding to characteristic configurations that the position determining device has, and so forth, is executed. Also, characteristics processing included in such a position determining method can be realized as a computer program that a computer including a processor, memory, and so forth, is caused to execute. It is needless to say that a computer program such as that above can be distributed via computer-readable non-transient recording media such as a CD-ROM or the like, or via a communication network such as the Internet or the like.

Accordingly, the following other aspects can yield the same advantages as those of the above-described position determining device.

A position determining method according to another aspect of the present disclosure is a position determining method that determines an unloading position of a package from an autonomous vehicle from which a package can be unloaded from multiple unloading positions. The method includes: acquiring a delivery destination address of the package, and stopping position attributes information indicating attributes of a stopping position where the autonomous vehicle stops to deliver the package to the address; determining an orientation of the unloading position of the package, based on the stopping position attributes information correlated with the delivery destination address of the package; and outputting management information that manages the package and the orientation of the unloading position of that package in a correlated manner.

Also, an autonomous vehicle according to another aspect of the present disclosure is an autonomous vehicle from which a package can be unloaded from multiple unloading positions. The autonomous vehicle includes: a moving mechanism unit that moves the package; and a control unit that acquires the management information from the position determining device according to any one of the position determining devices above, and controls the moving mechanism unit so that the orientation of unloading position of the package is set in accordance with the management information.

According to this configuration, management information is acquired from any one of the above position determining devices, and the moving mechanism unit is controlled so that the orientation of unloading position of the package is set in accordance with the management information, so the orientation of the unloading position can be automatically laid out to be an orientation suitable for the attributes of the stopping position, and in a case of delivering packages using an unmanned autonomous vehicle, the recipient can easily unload the package from the orientation of the unloading position suitable for the reception site of the package.

The moving mechanism unit may include an orientation changing mechanism that changes the orientation of the unloading position of the package.

According to this configuration, the orientation of the unloading position of the package can be automatically changed.

The moving mechanism unit may include a height changing mechanism that changes the height of the unloading position of the package.

According to this configuration, the height of the unloading position of the package can be automatically changed.

Also, a position determining system according to another aspect of the present disclosure includes: an autonomous vehicle from which a package can be unloaded from multiple unloading positions; and a position determining device that determines an unloading position of a package of the autonomous vehicle. The position determining device includes an acquiring unit that acquires a delivery destination address of the package, and stopping position attributes information indicating attributes of a stopping position where the autonomous vehicle stops to deliver the package to that address, a determining unit that determines an orientation of the unloading position of the package, based on the stopping position attributes information correlated with the delivery destination address of the package, and an output unit that outputs management information that manages the package and the orientation of the unloading position of the package in a correlated manner. The autonomous vehicle includes a moving mechanism unit that moves the package, and a control unit that acquires the management information from the position determining device, and controls the moving mechanism unit so that the orientation of unloading position of the package is set in accordance with the management information.

According to this configuration, advantages the same as those of the position determining device and autonomous vehicle above can be acquired.

Embodiments of the present disclosure will be described with reference to the drawings. The embodiments described below each indicate a specific example of the present invention. That is to say, shapes, components, steps, orders of steps, and so forth in the following embodiments are only exemplary, and are not intended to restrict the present disclosure.

Also, components in the following embodiments which are not included in an independent Claim of the present disclosure indicating the highest concept are described as being optional components. Also, in all of the embodiments the contents of each of the embodiments may be combined. Various types of modifications of the embodiments of the present disclosure within a range conceivable by one skilled in the art without departing from the essence of the present disclosure are also encompassed by the present disclosure.

Embodiments of the present disclosure will now be described with reference to the drawings.

First Embodiment

FIG. 1 is a schematic diagram illustrating an example of the configuration of a position determining system according to a first embodiment of the present disclosure. The position determining system illustrated in FIG. 1 includes a position determining device 1, an unmanned delivery vehicle 2, a loading worker's terminal 3 and a recipient's terminal 4. The position determining device 1 includes a package unloading position determining unit 11 and a delivery management unit 12.

The position determining device 1, loading worker's terminal 3, and recipient's terminal 4 are communicably connected via a predetermined wired or wireless network (omitted from illustration), such as the Internet, a dedicated line, or the like.

The position determining device 1 is installed within a building DC of a courier, for example, and is made up of a server or the like having a processor, memory, an external storage device, and so forth. The unmanned delivery vehicle 2 is an autonomous vehicle from which packages can be unloaded from multiple unloading positions. The loading worker's terminal 3 is made up of a tablet or the like having a processor and memory and so forth, for example, and is used by a loading worker P1. The recipient's terminal 4 is made up of a smartphone or the like having a processor and memory and so forth, for example, and is used by a recipient R2.

Note that the configuration of the position determining device 1 is not restricted in particular to the above-described example, and various modifications can be made, such as a predetermined cloud server functioning as the position determining device 1, functions of the position determining device 1 being added to the loading worker's terminal 3, and so forth. The configuration of the loading worker's terminal 3 is not restricted in particular to the above-described example, and a different terminal may be used, such as a smartphone, a desktop or portable personal computer, or the like. The configuration of the recipient's terminal 4 is not restricted in particular to the above-described example, and a different terminal may be used, such as a smartphone, a desktop or portable personal computer, or the like.

The unmanned delivery vehicle 2 performs complete autonomous driving of Level 4, and delivers packages in an unmanned state. Multiple lockers are installed in a lattice form on the right-side face, left-side face, and rear face of the unmanned delivery vehicle 2. Packages can be loaded to the lockers, and the positions of the lockers are unloading positions of the packages.

The position determining device 1 determines package unloading positions of the unmanned delivery vehicle 2 from which packages can be unloaded from multiple unloading positions. The package unloading position determining unit 11 determines the package unloading positions of the unmanned delivery vehicle 2, and the delivery management unit 12 transmits management information for managing by correlating packages with the orientation and height of unloading positions of the packages to the loading worker's terminal 3. The loading worker P1 confirms the management information of the loading worker's terminal 3, and loads the packages into the lockers with the orientation and height for the unloading positions indicated by the management information. Thus, one package is loaded in one locker when loading packages.

Note that in the present embodiment, determining which locker to load a package into, and determining the package unloading position, are equivalent. Loading packages in lockers by following management information for managing by correlating packages with the orientation and height of the unloading position of the packages means that the recipient R2 will unload packages from the lockers at the orientation and height of the unloading positions specified in the management information.

Note that the package loading method is not restricted in particular to the above-described example, and that various modifications may be made, such as transmitting management information to a loading robot (omitted from illustration), with the loading robot using the management information to load the packages to lockers having the orientation and height of the unloading positions indicated by the management information and so forth.

After the loading of packages described above has ended, the unmanned delivery vehicle 2 delivers the packages by autonomous driving. At this time, the delivery management unit 12 of the position determining device 1 transmits management information, including a locker No. where a package for the recipient R2 has been loaded, to the recipient's terminal 4. When the unmanned delivery vehicle 2 arrives at the recipient's home RH, the recipient R2 can unload the package from the locker of the locker No. displayed on the recipient's terminal 4.

Note that the management information transmitted to the recipient's terminal 4 is not restricted in particular to the above-described example, and that various modifications may be made, such as transmitting information of the orientation and height of the package unloading position for the recipient R2 as it is, or transmitting a command to the recipient's terminal 4 for causing a lamp or the like attached to a locker where the package of the recipient R2 is stored and the recipient's terminal 4 transmitting this command to the unmanned delivery vehicle 2, so that the unmanned delivery vehicle 2 lights up the lamp or the like of the relevant locker, or the like, for example.

Figure 2:
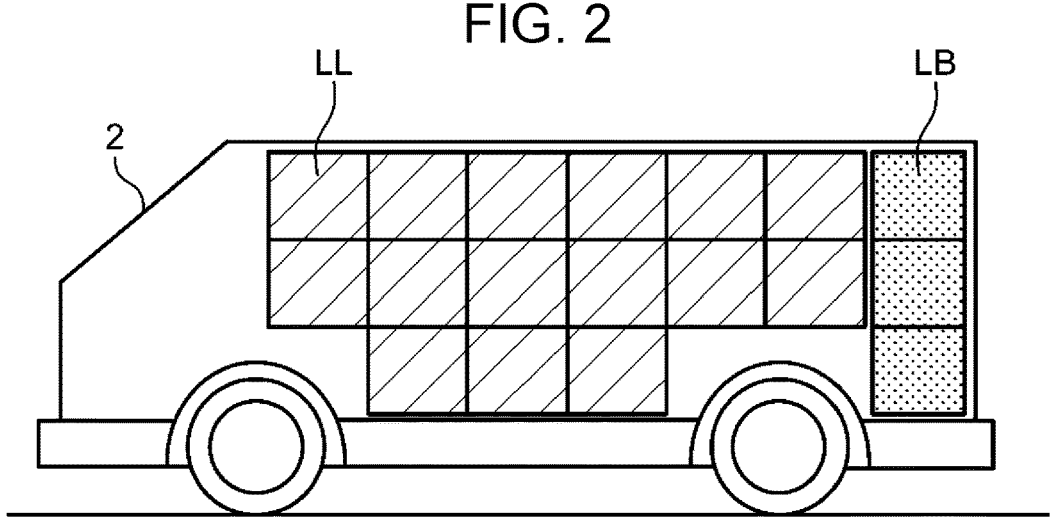
FIG. 2 is a left-side view illustrating a locker layout example at the left-side face of an unmanned delivery vehicle illustrated in FIG. 1.
Figure 3:
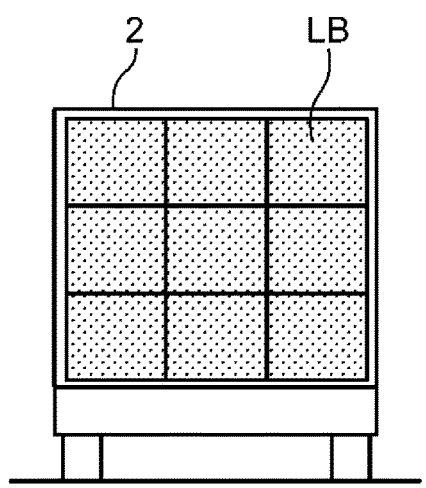
FIG. 3 is a rear-side view illustrating a locker layout example at the rear face of the unmanned delivery vehicle illustrated in FIG. 1.
Figure 4:
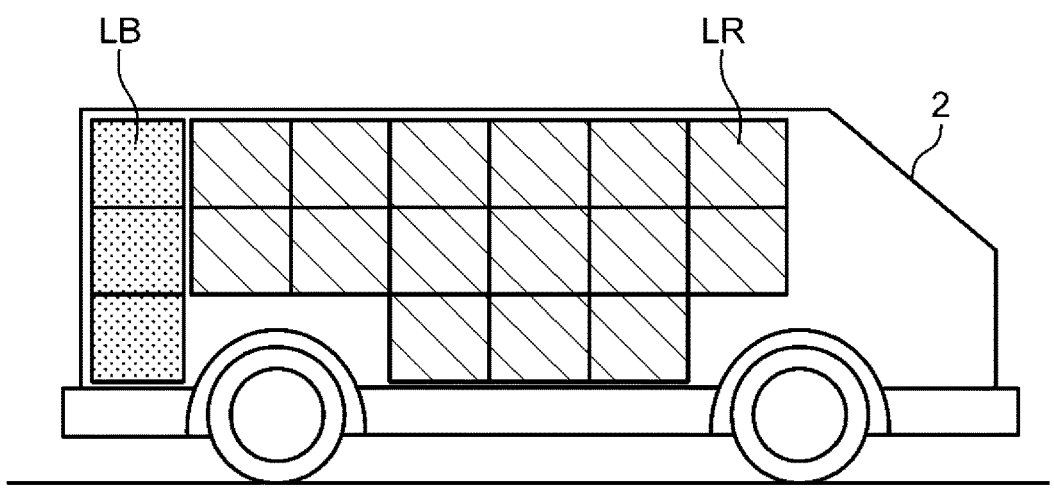
FIG. 4 is a right-side view illustrating a locker layout example at the right-side face of the unmanned delivery vehicle illustrated in FIG. 1.

FIG. 2 is a left-side view illustrating a locker layout example at the left-side face of the unmanned delivery vehicle 2 illustrated in FIG. 1, FIG. 3 is a rear-side view illustrating a locker layout example at the rear side of the unmanned delivery vehicle 2 illustrated in FIG. 1, and FIG. 4 is a right side view illustrating a locker layout example at the right side of the unmanned delivery vehicle 2 illustrated in FIG. 1.

As illustrated in FIG. 2, lockers LL are arrayed in a lattice form three in the vertical direction and six in the horizontal direction at the left side (left-side face) of the unmanned delivery vehicle 2, except for part of the front-face side, rear-face side, and portions overlapping the tires. Also, as illustrated in FIG. 3, lockers LB are arrayed in a lattice form three in the vertical direction and three in the horizontal direction at the rear side (rear face) of the unmanned delivery vehicle 2. Also, as illustrated in FIG. 4, lockers LR are arrayed in a lattice form three in the vertical direction and six in the horizontal direction at the right side of the unmanned delivery vehicle 2, except for part of the front-face side, rear-face side, and portions overlapping the tires.

Thus, the orientation of the package unloading position of lockers LL is the left side of the unmanned delivery vehicle 2, the orientation of the package unloading position of lockers LB is the rear side of the unmanned delivery vehicle 2, and the orientation of the package unloading position of lockers LR is the right side of the unmanned delivery vehicle 2. There are three tiers for the heights of the package unloading positions for lockers LL, LB, and LR, which are a high position at the upper tier, a middle position at the middle tier, and a low position at the lower tier. Note that the shapes, layout, and number of lockers are not restricted in particular to the above-described example, and that various modifications may be made, such as layouts of lockers in the heights of two tiers or four tiers or more, or lockers of different sizes being laid out, or the like.

Figure 5:
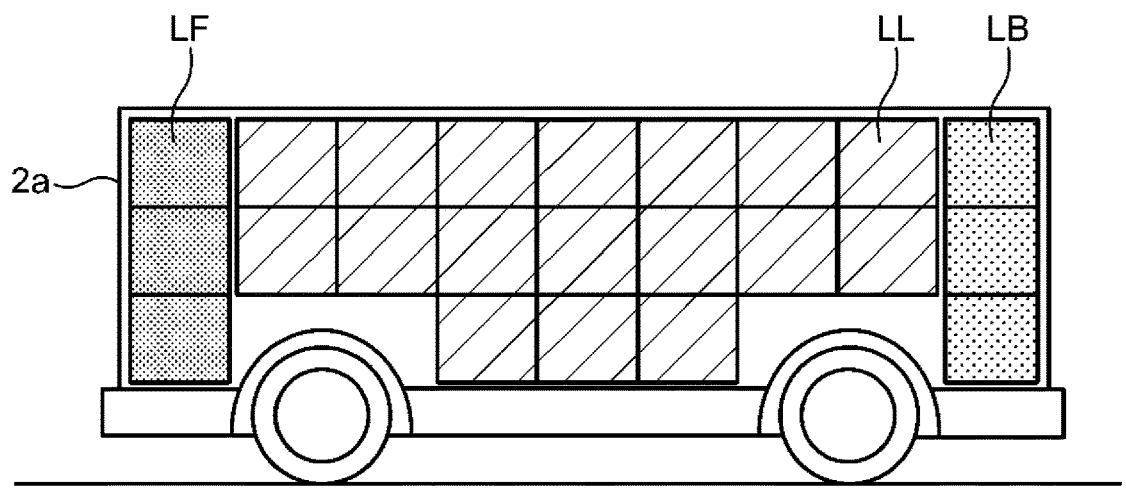
FIG. 5 is a left-side view illustrating a locker layout example at the left-side face of another unmanned delivery vehicle usable in the position determining system illustrated in FIG. 1.
Figure 6:
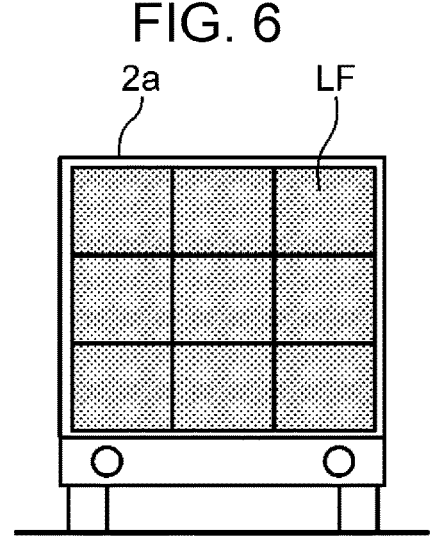
FIG. 6 is a front-side view illustrating a locker layout example at the front side of another unmanned delivery vehicle usable in the position determining system illustrated in FIG. 1.
Figure 7:
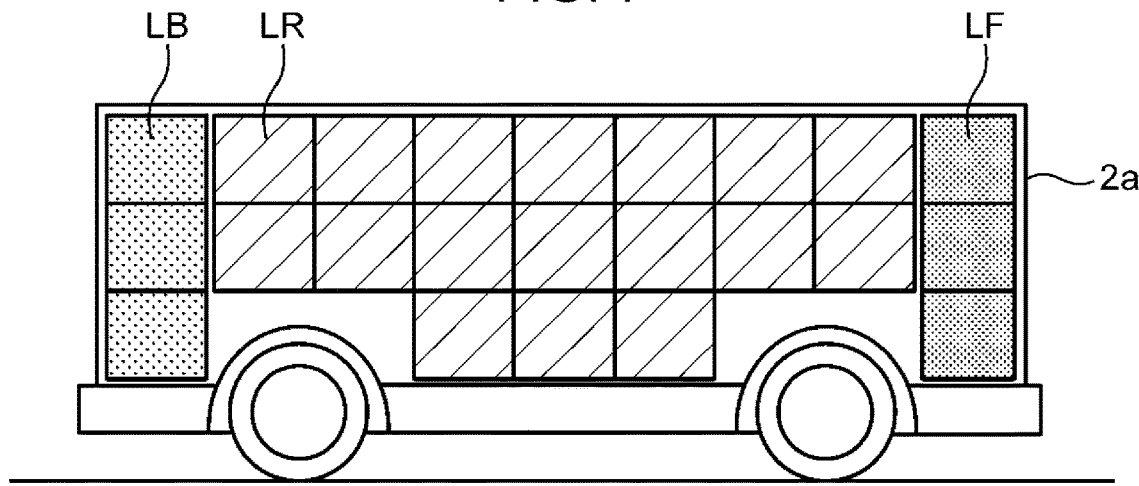
FIG. 7 is a right-side view illustrating a locker layout example at the right-side face of another unmanned delivery vehicle usable in the position determining system illustrated in FIG. 1.

The unmanned delivery vehicle 2 is an unmanned delivery vehicle, so the portion of driver's seat and passenger seat in normal vehicles can be eliminated, with lockers laid out at the front side of the vehicle as well. FIG. 5 is a left-side view illustrating a locker layout example at the left side of another unmanned delivery vehicle usable in the position determining system illustrated in FIG. 1, FIG. 6 is a front-side view illustrating a locker layout example at the front side of another unmanned delivery vehicle usable in the position determining system illustrated in FIG. 1, and FIG. 7 is a right-side view illustrating a locker layout example at the right side of another unmanned delivery vehicle usable in the position determining system illustrated in FIG. 1.

As illustrated in FIG. 5, lockers LL are arrayed in a lattice form three in the vertical direction and seven in the horizontal direction at the left side of an unmanned delivery vehicle 2a, except for part of the front-face side, rear-face side, and portions overlapping the tires. Also, as illustrated in FIG. 6, lockers LF are arrayed in a lattice form three in the vertical direction and three in the horizontal direction at the front side (front face) of the unmanned delivery vehicle 2a. Also, as illustrated in FIG. 7, lockers LR are arrayed three in a lattice form in the vertical direction and seven in the horizontal direction at the right side of the unmanned delivery vehicle 2a, except for part of the front-face side, rear-face side, and portions overlapping the tires. Note lockers LR are arrayed at the rear side of the unmanned delivery vehicle 2a in the same way as in FIG. 3.

In this case, the orientation of the unloading positions of packages in the lockers LL is the left side of the unmanned delivery vehicle 2a, the orientation of the unloading positions of packages in the lockers LF is the front side of the unmanned delivery vehicle 2a, the orientation of the unloading positions of packages in the lockers LR is the right side of the unmanned delivery vehicle 2a, and the orientation of the unloading positions of packages in the lockers LB is the rear side of the unmanned delivery vehicle 2a. There are three tiers for the heights of the package unloading positions for lockers LL, LF, LR, and LB, which are a high position at the upper tier, a middle position at the middle tier, and a low position at the lower tier. Thus, the unmanned delivery vehicle 2a with lockers arrayed in this way may be used in the position determining system illustrated in FIG. 1 instead of the unmanned delivery vehicle 2.

Figure 8:
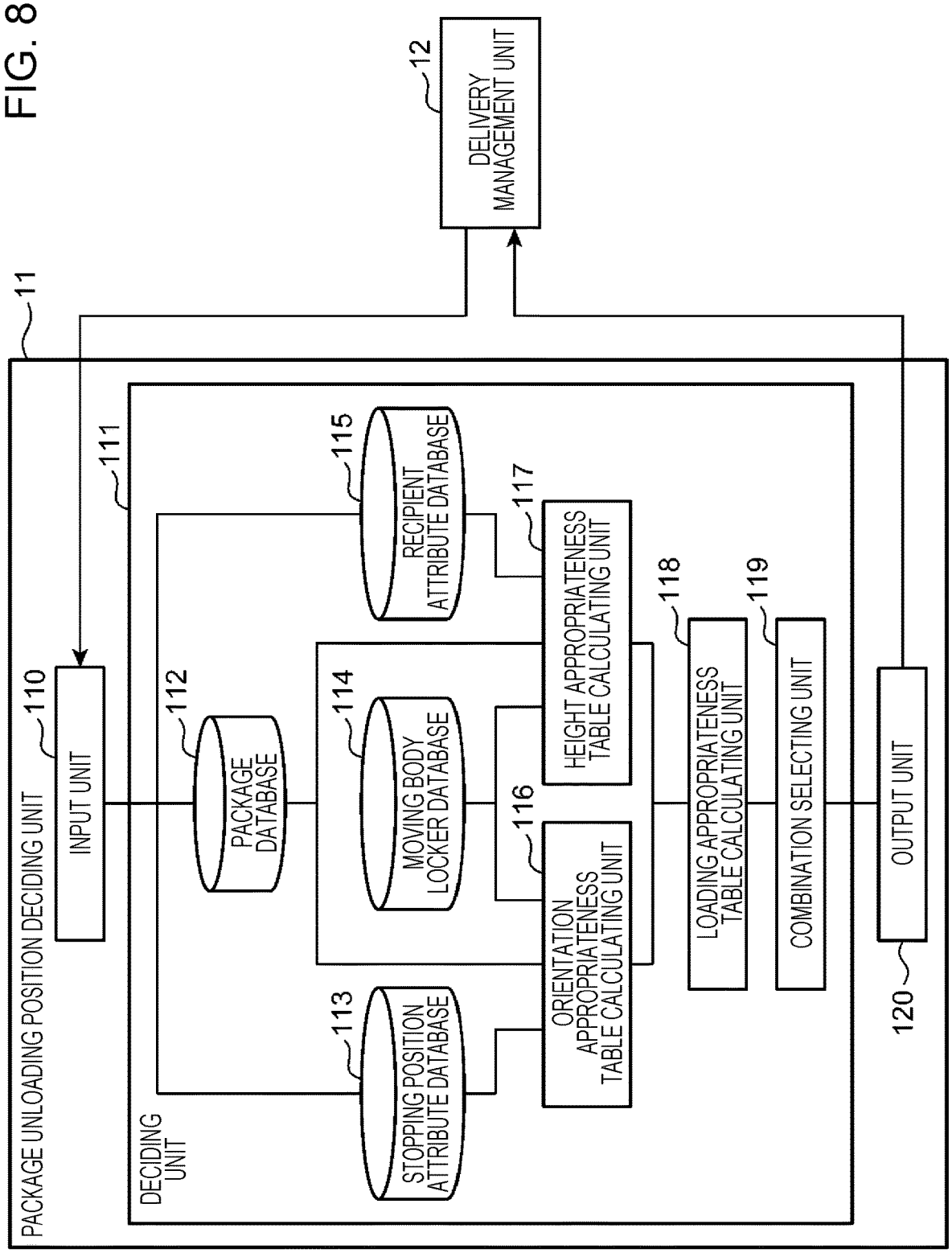
FIG. 8 is a block diagram illustrating an example of the configuration of a package unloading position determining unit illustrated in FIG. 1.

FIG. 8 is a block diagram illustrating an example of the configuration of the package unloading position determining unit 11 illustrated in FIG. 1. The package unloading position determining unit 11 includes an input unit 110, a determining unit 111, and an output unit 120. The determining unit 111 includes a package database 112, a stopping position attributes database 113, a moving body locker database 114, a recipient attributes database 115, an orientation appropriateness table calculating unit 116, a height appropriateness table calculating unit 117, a loading appropriateness table calculating unit 118, and a combination selecting unit 119.

Upon the loading worker P1 using the loading worker's terminal 3 to input data of a package table correlating identification Nos. of multiple packages to be delivered, delivery destination addresses, and recipient identification information for identifying recipients, the delivery management unit 12 receives the data of the package table from the loading worker's terminal 3, and outputs to the input unit 110. The input unit 110 stores the data of the package table from the delivery management unit 12 in the package database 112. The package database 112 outputs the data of the stored package table to the orientation appropriateness table calculating unit 116 and height appropriateness table calculating unit 117.

FIG. 9 is a diagram illustrating an example of a package table stored in the package database 112 illustrated in FIG. 8. Data of a package table correlating packages (identification Nos. of packages), addresses (delivery destination addresses), and recipients (identification Nos. of recipients), as illustrated in FIG. 9, is stored in the package database 112. For example, the delivery destination address of a package "B1" is "A1", and the recipient of the package "B1" is "R1". Note that recipient identification information and so forth is not restricted in particular to the above-described example, and that various modifications may be made, such as using the name of the recipient, and so forth.

The moving body locker database 114 stores beforehand data of a moving body locker table correlating identification Nos. of lockers of the unmanned delivery vehicle 2, the orientations of the lockers, and the heights of the lockers. The moving body locker database 114 outputs the data of the moving body locker table stored therein to the orientation appropriateness table calculating unit 116 and height appropriateness table calculating unit 117.

FIG. 10 is a diagram illustrating an example of the moving body locker table stored in the moving body locker database 114 illustrated in FIG. 8. Data of the moving body locker table correlating the lockers (locker identification Nos.), the orientations of the lockers, and the heights of the lockers, is stored in the moving body locker database 114 in a table format, as illustrated in FIG. 10. For example, the orientation of a locker of identification No. "L1" is facing "left" (a locker situated to the left side of the unmanned delivery vehicle 2), and the height thereof is "high" (a locker situated to the upper tier of the unmanned delivery vehicle 2).

Upon the loading worker P1 using the loading worker's terminal 3 to input data of a stopping position attributes table correlating delivery destination addresses of packages, stopping positions where the unmanned delivery vehicle 2 will stop to deliver the packages to these addresses, and stopping position attributes information indicating the attributes of these stopping positions, the delivery management unit 12 receives the data of the package table from the loading worker's terminal 3, and outputs to the input unit 110. The input unit 110 stores the data of the stopping position attributes table from the delivery management unit 12 in stopping position attributes database 113.

The stopping position attributes database 113 also stores beforehand data of a stopping position attributes/orientation appropriateness table correlating stopping position attributes information indicating stopping position attributes, unloading orientation, and orientation appropriateness. The stopping position attributes database 113 outputs data of the stopping position attributes table and data of the stopping position attributes/orientation appropriateness table stored therein to the orientation appropriateness table calculating unit 116. Note that the data of the stopping position attributes table is not restricted in particular to the above-described example, and may be stored in the stopping position attributes database 113 beforehand.

FIG. 11 is a diagram illustrating an example of the stopping position attributes table stored in the stopping position attributes database 113 illustrated in FIG. 8, data of the stopping position attributes table that correlates addresses (delivery destination addresses), stopping positions, and stopping position attributes (stopping position attributes information), is stored in the stopping position attributes database 113 in a table format, as illustrated in FIG. 11.

For example, the stopping position of delivery destination address "A1" is "x1, y1", and the stopping position attributes information of this stopping position is traffic amount information relating to traffic amount indicating "heavy traffic" (amount of traffic is heavier than a predetermined amount). The stopping position of delivery destination address "A2" is "x2, y2", and the stopping position attributes information of this stopping position is stopping orientation information relating to the stopping orientation of the unmanned delivery vehicle 2, indicating "stop backwards" (to stop facing backwards). The stopping position of delivery destination address "A3" is "x3, y3", and the stopping position attributes information of this stopping position is obstruction information relating to an obstruction in the vicinity of the stopping position, indicating that there is an "obstruction to left side".

Note that stopping position attributes information is not restricted in particular to the above-described example, and that various modifications may be made, such as, for example, using lane count information relating to a count of lanes of a road at the stopping position, such as using lane count information indicating "lane count of two lanes or more on each side of the road", or using at least one of traffic amount information relating to the amount of traffic at the stopping position, lane count information relating to a count of lanes of a road at the stopping position, stopping orientation information relating to the stopping orientation of the unmanned delivery vehicle 2, and obstruction information relating to obstructions in the vicinity of the stopping position.

FIG. 12 is a diagram illustrating an example of the stopping position attributes/orientation appropriateness table stored in the stopping position attributes database 113 illustrated in FIG. 8. Data of the stopping position attributes/orientation appropriateness table correlating the stopping position attributes (stopping position attributes information), unloading orientation, and orientation appropriateness is stored in the stopping position attributes database 113 in a table format, as illustrated in FIG. 12.

For example, in a case where the traffic amount information relating to traffic amount indicating "heavy traffic", "1.0", "0.7", and "0.3" are set for the unloading orientations "left", "rear", and "right", respectively. In a case where the stopping position attributes information is stopping orientation information of "stop backwards", "0.5", "1.0", and "0.8" are set for the unloading orientations "left", "rear", and "right", respectively. In a case where the stopping position attributes information is obstruction information of "obstruction to left side", "0.0", "0.8", and "1.0" are set for the unloading orientations "left", "rear", and "right", respectively.

Now the orientation appropriateness is a numerical value in the range of 0 to 1.0, with 1.0 representing the orientation regarding which unloading of the package is the easiest, and 0.0 representing the orientation regarding which unloading of the package is the hardest. Note that the orientation appropriateness is not restricted in particular to the above-described example, and that optional values may be set in accordance with the stopping position attributes, and various types of modifications can be made such as using values of other numerical value ranges, using level displays such as "appropriate" and "inappropriate", and so forth, for example.

The orientation appropriateness table calculating unit 116 calculates, for each package, an orientation appropriateness representing the degree of ease of unloading that package with regard to each of the orientations of the multiple unloading positions, based on the stopping position attributes information correlated with the delivery destination addresses of each of the multiple packages, and outputs the calculated orientation appropriateness to the loading appropriateness table calculating unit 118.

Specifically, the orientation appropriateness table calculating unit 116 compiles data of an address/orientation appropriateness table, correlating addresses, unloading orientations, and orientation appropriateness, using the data of the stopping position attributes table and stopping position attributes/orientation appropriateness table from the stopping position attributes database 113. For example, in a case of describing in a relational database Structure Query Language (SQL) sentence, the orientation appropriateness table calculating unit 116 executes processing of "select address, unloading orientation, orientation appropriateness from stopping position attributes table, stopping position attributes/orientation appropriateness table where stopping position attributes table. stopping position attributes=stopping position attributes/orientation appropriateness table stopping position attributes", to compile the data of the address/orientation appropriateness table.

FIG. 13 is a diagram illustrating an example of the address/orientation appropriateness table. As illustrated in FIG. 13, data of the address/orientation appropriateness table correlating addresses, unloading orientations, and orientation appropriateness, is compiled in a table format, with regard to all combinations of addresses, and unloading orientations. For example, in the case of address "A1", orientation appropriateness "1.0", "0.7", and "0.3" are correlated with unloading orientations "left", "rear", and "right", respectively.

Next, the orientation appropriateness table calculating unit 116 uses data of a package table from the package database 112, data of a moving body locker table from the moving body locker database 114, and the compiled address/orientation appropriateness table, to compile data of a package orientation appropriateness table, where the packages, lockers and orientation appropriateness have been correlated, and outputs the compiled package orientation appropriateness table to the loading appropriateness table calculating unit 118.

For example, in a case of describing in a relation data base SQL sentence, the orientation appropriateness table calculating unit 116 executes the processing of "select package, locker, orientation appropriateness from package table, moving locker table, address/orientation appropriateness table where package table. address=address/orientation appropriateness table. address and moving body locker table. locker orientation=address/orientation appropriateness table. unloading orientation", to compile the package orientation appropriateness table.

FIG. 14 is a diagram illustrating an example of the package orientation appropriateness table. As illustrated in FIG. 14, data of the package orientation appropriateness table correlating packages (package identification Nos.), lockers (locker identification Nos.), and orientation appropriateness is compiled in a table format, regarding all combinations of packages and lockers. For example, in the case of package "B1", orientation appropriateness of "1.0", "0.7", and "0.3" are corelated with lockers "L1", "L2", and "L3", respectively.

Also, upon the loading worker P1 using the loading worker's terminal 3 to input data of a recipient attributes table that correlates recipient identification information identifying the recipient and recipient attributes information indicating attributes of this recipient, the delivery management unit 12 receives data of the recipient attributes table from the loading worker's terminal 3 and outputs to the input unit 110. The input unit 110 stores the data of the recipient attributes table from the delivery management unit 12 in the recipient attributes database 115.

The recipient attributes database 115 also stores beforehand a recipient attributes/height appropriateness table that correlates recipient attributes information, locker height (locker unloading height), and height appropriateness. The recipient attributes database 115 outputs data of the recipient attributes table and data of the recipient attributes/height appropriateness table stored therein to the height appropriateness table calculating unit 117. Note that the data of the recipient attributes table is not restricted in particular to the above-described example, and may be stored in the recipient attributes database 115 beforehand.

FIG. 15 is a diagram illustrating an example of a recipient attributes table stored in a table format in the recipient attributes database 115 illustrated in FIG. 8. As illustrated in FIG. 15, data of the recipient attributes table that correlates recipients (recipient identification information) and recipient attributes (recipient attributes information) is stored in the recipient attributes database 115 in a table format.

For example, recipient attributes information of the recipient "R1" is height information relating to the height of the recipient, indicating "normal" (to say that the height of the recipient is in a normal range of height). Also, recipient attributes information of the recipient "R2" is age information relating to the age of the recipient, indicating "aged" (to say that the age of the recipient is higher than a predetermined value). Recipient attributes information of the recipient "R3" is handicap information relating to whether or not the recipient is handicapped, indicating "physically impaired" (to say that the recipient is handicapped). Also, in a case where the height of the recipient is lower than a predetermined value, height information of "short" is used, and a case where the height of the recipient is higher than a predetermined value, height information of "tall" is used.

Note that the recipient attributes information is not restricted in particular to the above-described example, and that various modifications may be made using other information, such as, for example, using gender information such as male/female or the like, using a value of the height of the recipient such as "170 cm" or the like for the height information, using age of the recipient such as "75 years old" as age information, using "wheelchair" as handicap information, and so forth. Also, at least one of height information relating to the height of the recipient R2, age information relating to the age of the recipient R2, and handicap information relating to whether the recipient R2 is handicapped or not, for example, may be used as the recipient attributes information.

FIG. 16 is a diagram illustrating an example of a recipient attributes/height appropriateness table stored in the recipient attributes database 115 illustrated in FIG. 8. As illustrated in FIG. 16, data of the recipient attributes/height appropriateness table correlating recipient attributes (recipient attributes information), locker height, and height appropriateness, is stored in the recipient attribute database 115 in a table format.

For example, in a case where recipient attributes are height information of "normal", height appropriateness of "1.0", "0.9", and "0.8" are set for locker heights of "high", "middle", and "low", respectively. Also, in a case where recipient attributes are age information of "aged", height appropriateness of "0.3", "1.0", and "0.9" are set for locker heights of "high", "middle", and "low", respectively. Further, in a case where recipient attributes are handicap information of "physically impaired", height appropriateness of "0.0", "0.2", and "1.0" are set for locker heights of "high", "middle", and "low", respectively.

Now the height appropriateness is a numerical value in the range of 0 to 1.0, with 1.0 representing the height regarding which unloading of the package is the easiest, and 0.0 representing the height regarding which unloading of the package is the hardest. Note that the height appropriateness is not restricted in particular to the above-described example, and that optional values may be set in accordance with the recipient attributes, and various types of modifications can be made such as using values of other numerical value ranges, using level displays such as "appropriate" and "inappropriate", and so forth, for example.

The height appropriateness table calculating unit 117 calculates, for each package, the height appropriateness representing the degree of ease of unloading that package with regard to each of the multiple heights of unloading positions, based on the recipient attributes information correlated with the recipient identification for identification each of the recipients of the multiple packages, and outputs the calculated height appropriateness to the loading appropriateness table calculating unit 118.

Specifically, the height appropriateness table calculating unit 117 compiles data of a recipient/height appropriateness table correlating the recipient (recipient identification information), the locker height, and the height appropriateness, using the data of the recipient attributes table and the recipient attributes/height appropriateness table from the recipient attributes database 115. For example, the height appropriateness table calculating unit 117 executes the processing of "select recipient, locker height, height appropriateness from recipient attributes table, recipient attributes/height appropriateness table where recipient attributes table. recipient attributes=recipient attributes/height appropriateness table. recipient attributes" to compile data of the recipient/height appropriateness table.

FIG. 17 is a diagram illustrating an example of the recipient/height appropriateness table. Data of the recipient/height appropriateness table that correlates the recipient, locker height, and height appropriateness, with regard to all combinations of recipients and locker heights, is compiled in a table format, as illustrated in FIG. 17. For example, in the case of recipient "R1", height appropriateness of "1.0", "0.9", and "0.8" are set for locker heights of "high", "middle", and "low", respectively.

Next, the height appropriateness table calculating unit 117 compiles data of height appropriateness of packages correlating packages, lockers, and height appropriateness, using data of the package table from the package database 112, data of the moving body locker table from the moving body locker database 114, and data of the recipient/height appropriateness table that has been compiled, and outputs the data of the package height appropriateness table that has been compiled to the loading appropriateness table calculating unit 118.

For example, in a case of describing in a relational database SQL sentence, the height appropriateness table calculating unit 117 executes the processing of "select package, locker, height appropriateness from package table, moving body locker table, recipient/height appropriateness table where package table. recipient=recipient/height appropriateness. recipient and moving body locker table. locker height=recipient/height appropriateness table locker height" to compile the package height appropriateness table.

FIG. 18 is a diagram illustrating an example of the package height appropriateness table. Data of the package height appropriateness table that correlates the package (package identification No.), locker (locker identification No.), and height appropriateness, with regard to all combinations of packages and lockers, is compiled in a table format, as illustrated in FIG. 18. For example, in the case of package "B1", height appropriateness of "1.0", "0.9", and "0.8" are set for lockers "L1", "L2", and "L3", respectively.

The loading appropriateness table calculating unit 118 and combination selecting unit 119 determine the orientation of the unloading position for each of the multiple packages based on the orientation appropriateness in the orientation appropriateness table, determine the unloading position height for each of the multiple packages based on the height appropriateness in the height appropriateness table, and compile management information where packages and lockers in which the packages are loaded are correlated, with management information managing packages and unloading position orientations of the packages correlated, and with management information managing packages and unloading position heights of the packages correlated, based on the determined unloading position orientations and heights, and output the management information to the output unit 120.

The output unit 120 outputs management information where packages and lockers in which the packages are loaded are correlated to the delivery management unit 12. The delivery management unit 12 transmits the management information where packages and lockers in which the packages are loaded are correlated to the loading worker's terminal 3 when loading packages, and to the recipient's terminal 4 when receiving packages.

Specifically, the loading appropriateness table calculating unit 118 compiles data of a loading appropriateness table correlating packages, lockers, and loading appropriateness, using the package orientation appropriateness table from the orientation appropriateness table calculating unit 116 and the package height appropriateness table from the height appropriateness table calculating unit 117. For example, the loading appropriateness table calculating unit 118 acquires loading appropriateness $s(i, j)$ from orientation appropriateness $sa(i, j)$ and height appropriateness $sp(i, j)$ from the arithmetic equation $s(i, j)=\min(sa(i, j), sp(i, j))$, where i represents packages and j represents lockers, using the logical product (min) from fuzzy operation, to compile data of a loading appropriateness table, which is output to the combination selecting unit 119.

Now, the loading appropriateness is unloading appropriateness that represents the degree of ease of unloading packages with regard to each of the multiple unloading positions. According to the above-described processing, based on the orientation appropriateness and the height appropriateness, the loading appropriateness table calculating unit 118 calculates, for each of the packages, the unloading appropriateness representing the degree of ease of unloading packages with regard to each of the multiple unloading positions, and determines the orientations and heights of the unloading positions for each of the multiple packages based on the unloading appropriateness.

Note that the arithmetic equation of loading appropriateness $s(i, j)$ is not restricted in particular to the above-described example, and that any product operator will suffice, such as algebraic product "$sa(i, j) \times sp(i, j)$", bounded product "$\max(0, sa(i, j)+sp(i, j)-1)$, or the like.

FIG. 19 is a diagram illustrating an example of a loading appropriateness table. Calculating the logical product (min) regarding the package orientation appropriateness table illustrated in FIG. 14 and the package height appropriateness table illustrated in FIG. 18 compiles data of the loading appropriateness table where packages, lockers, and loading appropriateness are correlated with regard to all combinations of packages and lockers, in a table format, as illustrated in FIG. 19. For example, in the case of package "B1", loading appropriateness of "1.0", "0.7", and "0.3" are set for lockers "L1", "L2", and "L3", respectively.

Next, the combination selecting unit 119 uses the data of the loading appropriateness table compiled by the loading appropriateness table calculating unit 118 to acquire $\Sigma$ is $(i, j)$, i.e., a combination where the sum of "loading appropriateness $s(i, j)$" of all packages is greatest regarding all combinations of placing packages i in lockers j, and compiles data of a loading instruction table where packages and lockers into which the packages are to be loaded are correlated, which is output to the output unit 120.

FIG. 20 is a diagram illustrating an example of a loading instruction table. Data of a loading instruction table correlating packages (package identification Nos.) and lockers (locker identification Nos.) to which the packages are to be loaded is compiled in a table format, as illustrated in FIG. 20. For example, package "B1" is loaded in locker "L1", package "B2" is loaded in locker "L2", and package "B3" is loaded in locker "L8".

Note that while an example of compiling management information taking into consideration both stopping position attributes information and recipient attributes information has been described above, the above-described example is not restricting in particular, and management information may be compiled taking into consideration only stopping position attributes information, or management information may be compiled taking into consideration only recipient attributes information.

For example, in a case of taking into consideration only stopping position attributes information, the loading appropriateness table calculating unit 118 may calculate $s(i, j)$="orientation appropriateness $sa(i, j)$" of "delivery destination address" of package i as to locker j, as the loading appropriateness $s(i, j)$. Also, in a case of taking into consideration only recipient attributes information, the loading appropriateness table calculating unit 118 may calculate $s(i, j)$="height appropriateness $sa(i, j)$" of "recipient" of package i as to locker j, as the loading appropriateness $s(i, j)$.

Figure 21:
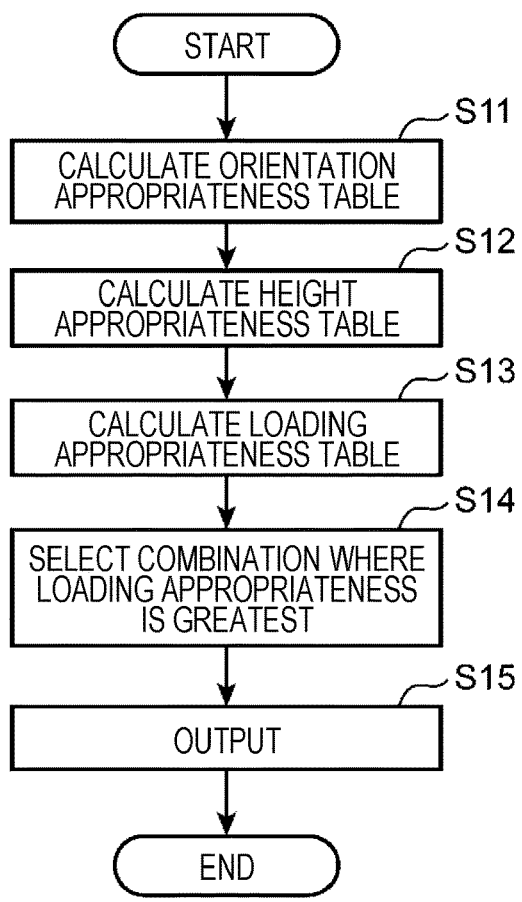
FIG. 21 is a flowchart illustrating an example of package unloading position determining processing by a package unloading position determining unit illustrated in FIG. 8.

Next, package unloading position determining processing by the package unloading position determining unit 11 configured as described above will be described. FIG. 21 is a flowchart illustrating an example of package unloading position determining processing by the package unloading position determining unit 11 illustrated in FIG. 8.

First, the orientation appropriateness table calculating unit 116 uses data of the stopping position attributes table and stopping position attributes/orientation appropriateness table from the stopping position attribute database 113 to compile data of the address/orientation appropriateness table, and calculates data of the package orientation appropriateness table using data of the package table from the package database 112, data of the moving body locker table from the moving body locker database 114, and data of the compiled address/orientation appropriateness table (step S11).

Next, the height appropriateness table calculating unit 117 compiles data of the recipient/height appropriateness table using data of the recipient attributes table and data of the recipient attributes/height appropriateness table from the recipient attributes database 115, and calculates data of the package height appropriateness table using data of the package table from the package database 112, data of the moving body locker table from the moving body locker database 114, and data of the compiled recipient/height appropriateness table (step S12).

Next, the loading appropriateness table calculating unit 118 uses the package orientation appropriateness table from the orientation appropriateness table calculating unit 116 and the package height appropriateness table from the height appropriateness table calculating unit 117 to calculate the data of the loading appropriateness table (step S13).

Next, the combination selecting unit 119 uses the loading appropriateness table compiled by the loading appropriateness table calculating unit 118 to select a combination where the loading appropriateness is greatest with regard to all combinations of placing packages i in lockers j (step S14).

Finally, based on the selected combinations of packages and lockers, the output unit 120 outputs management information where the packages and lockers to load the packages have been correlated, to the delivery management unit 12 (step S15).

Thereafter, the delivery management unit 12 transmits the management information where packages and lockers to load the packages have been correlated to the loading worker's terminal 3 when loading packages, and to the recipient's terminal 4 when receiving packages.

Figure 22:
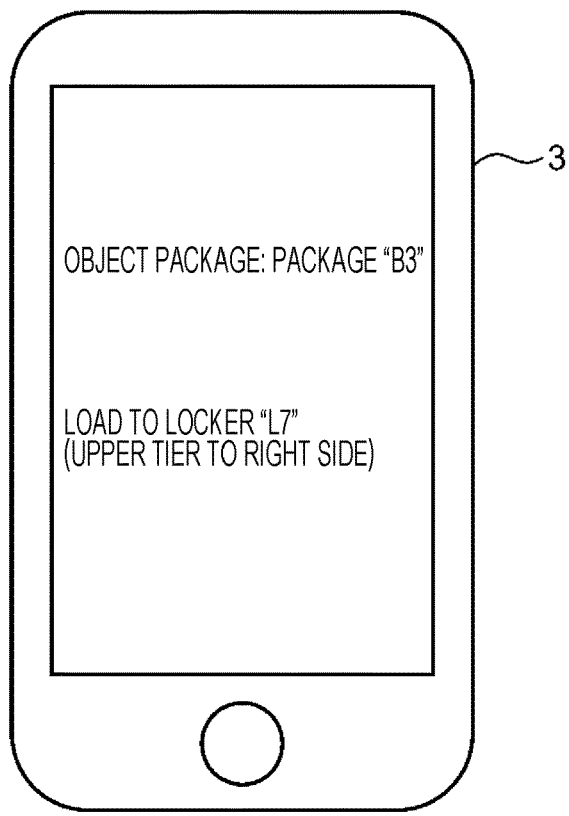
FIG. 22 is a diagram illustrating an example of management information displayed on a terminal used by a loading worker illustrated in FIG. 1.
Figure 23:
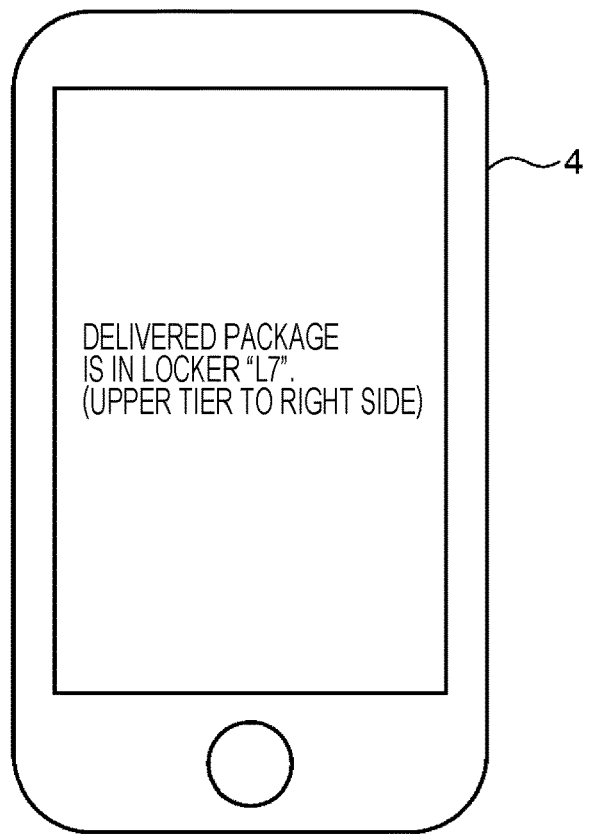
FIG. 23 is a diagram illustrating an example of management information displayed on a terminal used by a recipient illustrated in FIG. 1.

FIG. 22 is a diagram illustrating an example of management information displayed on the loading worker's terminal 3 illustrated in FIG. 1, and FIG. 23 is a diagram illustrating an example of management information displayed on the recipient's terminal 4 illustrated in FIG. 1.

When the above-described management information is transmitted to the loading worker's terminal 3 when loading packages, messages of "OBJECT PACKAGE: PACKAGE 'B3'" and "LOAD TO LOCKER 'L7' (UPPER TIER TO RIGHT SIDE)", for example, are displayed as illustrated in FIG. 22, so the loading worker P1 loads the package "B3" to the locker "L7" of the unmanned delivery vehicle 2.

Also, when the above-described management information is transmitted to the recipient's terminal 4 when receiving packages, a message of "DELIVERED PACKAGE IS IN LOCKER 'L7'. (UPPER TIER TO RIGHT SIDE)", for example, is displayed as illustrated in FIG. 23, so the recipient R2 unloads and receives the package from No. "7" locker.

According to this processing, in the present embodiment, orientation appropriateness is calculated, for each package, representing the degree of ease of unloading the package with regard to each of multiple unloading position orientations, based on stopping position attributes information correlated with delivery destination addresses of each of the multiple packages, and height appropriateness is calculated, for each package, representing the degree of ease of unloading the package with regard to each of multiple unloading position heights, based on recipient attributes information correlated with recipient identification information identifying recipients of each of the multiple packages, unloading appropriateness (loading appropriateness) is calculated, for each package, representing the degree of ease of unloading of the packages from each of the multiple unloading positions, based on the calculated orientation appropriateness and height appropriateness, and the orientation and height of the unloading positions, for each of multiple packages are determined based on the calculated unloading appropriateness, so the unloading position orientation of each of multiple packages can be determined to be an orientation appropriate for the stopping position attributes, and also the unloading position height of each of multiple packages can be determined to be a height appropriate for the recipient attributes.

As a result, by loading packages to the lockers of the unmanned delivery vehicle 2 at the orientations and heights determined as described above, the orientations and heights of the unloading positions are orientations and heights appropriate for the stopping position attributes and attributes of the recipient R2. When using the unmanned delivery vehicle 2 to deliver packages, orientations of the package unloading positions appropriate for package reception sites can be determined, and also heights of package unloading positions appropriate for recipients can be determined, so recipients can easily unload packages.

Note that the configuration of the determining unit 111 is not restricted in particular to the above-described example, and that the following arrangements may be made. For example, in a case where the stopping position attributes information includes traffic amount information relating to the traffic amount at the stopping position, and the delivery destination address of the package is correlated with traffic amount information indicating that the traffic amount of vehicles is heavier than a predetermined amount, the determining unit 111 may determine the package unloading position orientation to be on a side of the autonomous vehicle that is opposite from the center line of the road.

Also, in a case where the stopping position attributes information includes lane count information relating to the lane count of the road at the stopping position, and the delivery destination address of the package is correlated with lane count information indicating two lanes or more on each side of the road, the determining unit 111 may determine the unloading position orientation of the package to be a side of the autonomous vehicle that is closer to the edge of the road.

Also, in a case where the stopping position attributes information includes stopping orientation information relating to the stopping orientation of the unmanned delivery vehicle 2, and the delivery destination address of the package is correlated with stopping orientation information indicating stopping facing backwards, the determining unit 111 may determine the unloading position orientation of the package to be at the rear side of the unmanned delivery vehicle 2.

Also, in a case where the stopping position attributes information includes obstruction information relating to obstructions in the vicinity of the stopping position, and the delivery destination address of the package is correlated with obstruction information indicating that there is an obstruction in the vicinity (e.g., that there is an obstruction such as a ditch or the like on the left side), the determining unit 111 may determine the unloading position orientation of the package to be at the side where there is no obstruction.

Also, in a case where the recipient attributes information includes height information relating to the height of the recipient R2, and the height information indicates that the height of the recipient is lower than a predetermined value (e.g., to say that the height is shorter than 140 cm), the determining unit 111 may determine the unloading position height of the package to be a position lower than a predetermined middle position (e.g., a lower-tier locker).

Also, in a case where the recipient attributes information includes age information relating to the age of the recipient R2, and the age information indicates that the age of the recipient R2 is higher than a predetermined value (e.g., to say that the age is older than 65 years old), the determining unit 111 may determine the unloading position height of the package to be a position lower than a predetermined middle position (e.g., a lower-tier locker).

Also, in a case where the recipient attributes information includes handicap information relating to whether the recipient is handicapped or not, and the handicap information indicates that the recipient R2 is handicapped, the determining unit 111 may determine the unloading position height of the package to be a position lower than a predetermined middle position (e.g., a lower-tier locker).

Second Embodiment

Although a unmanned delivery vehicle 2 where multiple lockers are fixed is used in the above-described embodiment, a unmanned delivery vehicle where the lockers are movable will be used in the present embodiment, with the lockers being moved within the unmanned delivery vehicle so that the unloading position orientation of packages is at an orientation appropriate for the stopping position attributes and/or an appropriate height for recipient attributes. The configuration of the position determining system according to the present embodiment is the same as the position determining system illustrated in FIG. 1 except for the unmanned delivery vehicle, so illustration and detailed description will be omitted.

Figure 24:
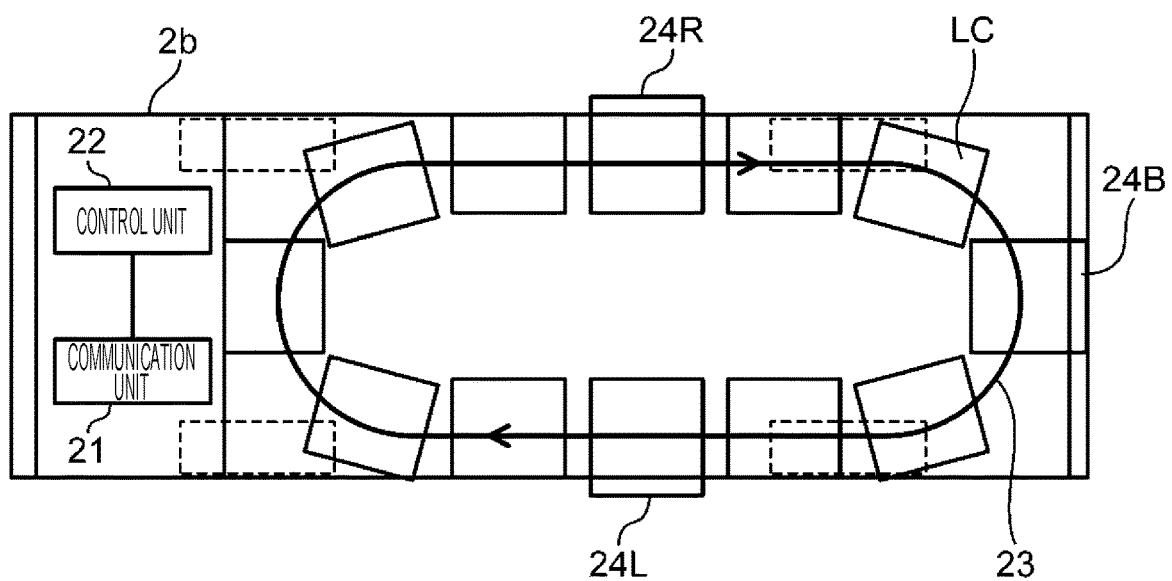
FIG. 24 is a cross-sectional view of an example of a moving mechanism in an unmanned delivery vehicle used in a position determining system according to a second embodiment of the present disclosure, as viewed from above.
Figure 25:
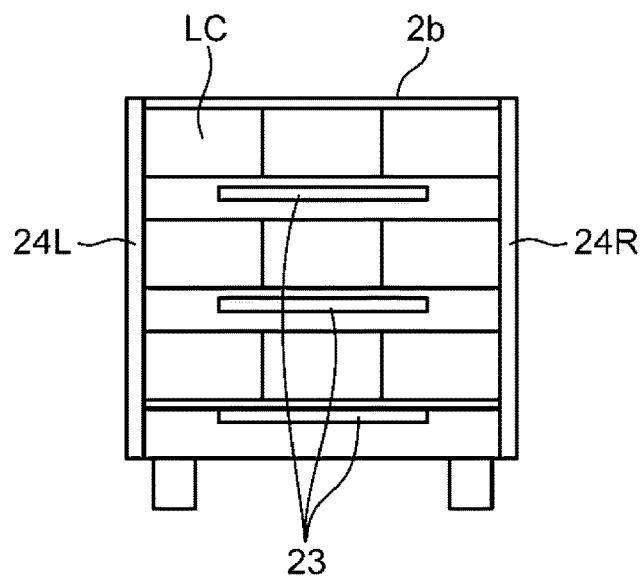
FIG. 25 is a cross-sectional view of an example of the moving mechanism in the unmanned delivery vehicle illustrated in FIG. 24, as viewed from the rear face.

FIG. 24 is a cross-sectional view of an example of a moving mechanism in an unmanned delivery vehicle used in the position determining system according to a second embodiment of the present disclosure, as viewed from above, and FIG. 25 is a cross-sectional view of an example of the moving mechanism in the unmanned delivery vehicle illustrated in FIG. 24, as viewed from the rear face.

An unmanned delivery vehicle 2b illustrated in FIGS. 24 and 25 has a communication unit 21, a control unit 22, and a turntable moving mechanism unit 23, and is an autonomous vehicle regarding which packages can be extracted from an unloading opening 24L at the left side, an unloading opening 24R at the right side, or an unloading opening 24B at the rear side.

The communication unit 21 is communicably connected to the position determining device 1 (see FIG. 1) via a predetermined wireless network (omitted from illustration), and receives management information and so forth from the position determining device 1 and outputs to the control unit 22. The control unit 22 uses the communication unit 21 to acquire management information from the position determining device 1, and controls the turntable moving mechanism unit 23 so that the unloading position orientations of packages are laid out according to the management information.

The turntable moving mechanism unit 23 is a moving mechanism unit that moves lockers LC storing packages, and includes an upper-tier turntable, a middle-tier turntable, and a lower-tier turntable. The upper-tier turntable, middle-tier turntable, and lower-tier turntable each are orientation changing mechanisms that can change the orientation of package unloading positions to one of the unloading openings 24L, 24R, and 24B for packages.

Specifically, the upper-tier turntable moves lockers LC storing packages in the direction of the arrows in FIGS. 24 and 25, thereby moving the lockers LC storing packages to one of the unloading opening 24L at the left side of the unmanned delivery vehicle 2b, the unloading opening 24R at the right side, and the unloading opening 24B at the rear side. In the same way, the middle-tier turntable and lower-tier turntable moves lockers LC storing packages to one of the unloading opening 24L at the left side of the unmanned delivery vehicle 2b, the unloading opening 24R at the right side, and the unloading opening 24B at the rear side.

As described above, the lockers LC of the unmanned delivery vehicle 2b are movable, so the loading positions of packages at the time of loading can be optional. The lockers LC, i.e., packages are moved to one of the package unloading openings 24L, 24R, and 24B by the time of reception, and the orientations of unloading position of the packages are changed following the management information that the position determining device 1 has determined as described above. Note that in the present embodiment, no vertical movement of the lockers LC, i.e., packages is performed, so regarding the height of the package unloading positions, the loading worker P1 (see FIG. 1) loads packages to lockers LC of heights according to the management information. Moving of packages preferably is completed by the time of reception.

As described above, in the present embodiment, management information is acquired from the position determining device 1, and lockers LC, i.e., packages are moved to one of the unloading opening 24L at the left side, the unloading opening 24R at the right side, and the unloading opening 24B at the rear side, so that the orientation of package unloading positions are arranged in accordance with the management information. Accordingly, the orientation of the unloading position can be automatically arranged to face an orientation appropriate for the stopping position attributes. When delivering packages using the unmanned delivery vehicle 2b, the recipient can easily unload packages from the orientation of the package unloading position appropriate for the reception site of the package (unloading opening 24L at the left side, unloading opening 24R at the right side, or unloading opening 24B at the rear side).

Figure 26:
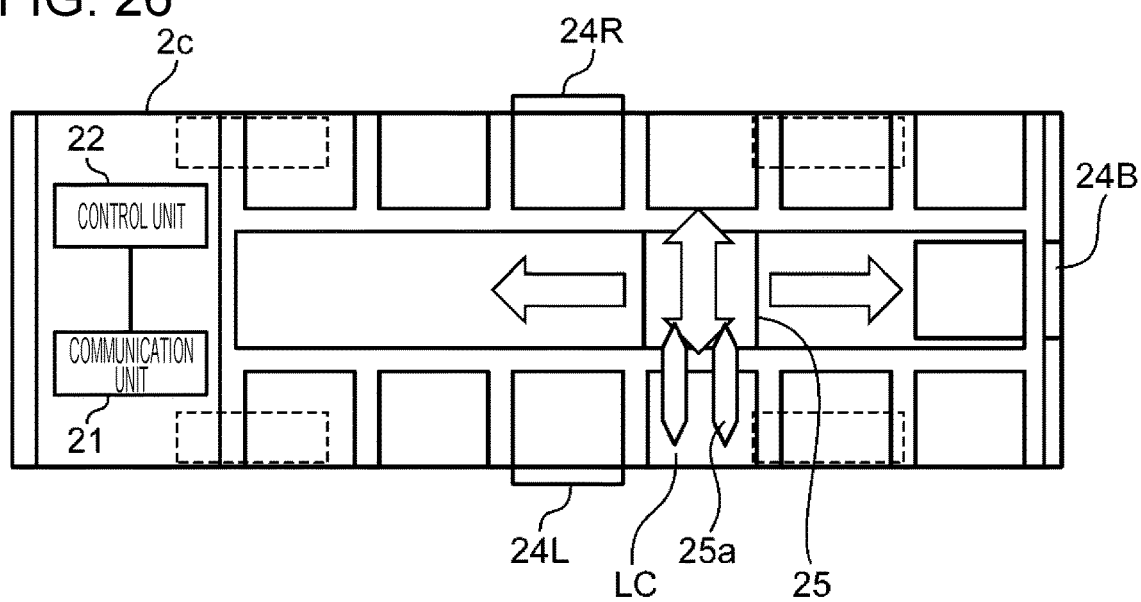
FIG. 26 is a cross-sectional view of an example of a moving mechanism in another unmanned delivery vehicle used in a position determining system according to the second embodiment of the present disclosure, as viewed from above.

Note that the moving mechanism unit is not restricted in particular to the turntable moving mechanism unit 23 above, and that various modifications may be made, such as for example, using a moving mechanism unit that is capable of moving lockers, i.e., packages in the horizontal direction and the vertical direction. FIG. 26 is a cross-sectional view of an example of a moving mechanism in another unmanned delivery vehicle used in a position determining system according to the second embodiment of the present disclosure, as viewed from above, and FIG. 27 is a cross-sectional view of an example of the moving mechanism in the unmanned delivery vehicle illustrated in FIG. 26, as viewed from the rear face.

Figure 27:
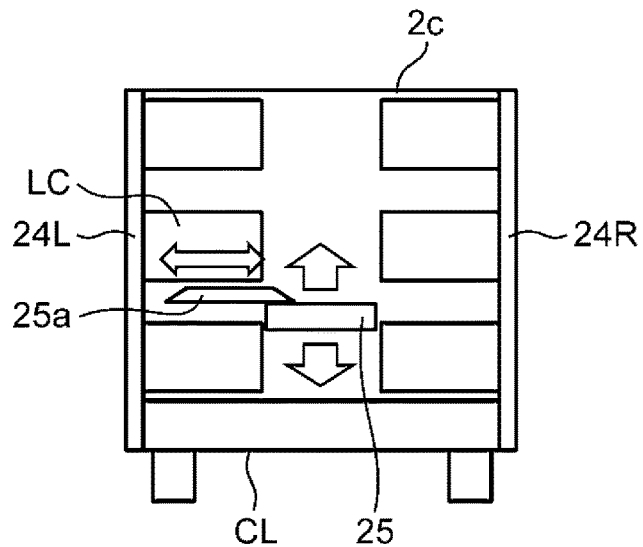
FIG. 27 is a cross-sectional view of an example of the moving mechanism in the unmanned delivery vehicle illustrated in FIG. 26, as viewed from the rear face.

The unmanned delivery vehicle 2c illustrated in FIGS. 26 and 27 has the communication unit 21, control unit 22, and a crane moving mechanism unit 25 including a fork 25a, and is an autonomous vehicle capable of unloading packages stored in lockers at the upper tier, middle tier, and lower tier, from the unloading opening 24L at the left side, the unloading opening 24R at the right side, and the unloading opening 24B at the rear side.

The communication unit 21 is communicably connected to the position determining device 1 via a predetermined wireless network (omitted from illustration), and receives management information and so forth from the position determining device 1 and outputs to the control unit 22. The control unit 22 uses the communication unit 21 to acquire management information from the position determining device 1, and controls the crane moving mechanism unit 25 so that the unloading position orientations and heights of packages are laid out according to the management information.

The crane moving mechanism unit 25 is a moving mechanism unit that moves lockers LC storing packages, and is an orientation and height changing mechanism that changes the orientation and height of package unloading positions. Specifically, the crane moving mechanism unit 25 changes the orientation of package unloading positions to one of the unloading openings 24L, 24R, and 24B, for packages, and also changes the height of the package unloading positions to one of the upper tier, middle tier, and lower tier, by inserting the fork 25a to the lower portion of the lockers LC and moving in the horizontal direction and vertical direction (direction of arrows FIGS. 26 and 27).

An example of operations of the unmanned delivery vehicle 2c from the loading worker P1 (see FIG. 1) loading a package to lockers of the unmanned delivery vehicle 2c configured as described above, to the recipient R2 (see FIG. 1) subsequently unloading the package, will be described in detail.

First, the loading worker P1 loads a package i to an empty locker j. Next, the loading worker P1 inputs to the loading worker's terminal 3 (see FIG. 1) that the package i has been loaded to the locker j, thereby notifying the delivery management unit 12 (see FIG. 1). Note that in a case where each locker has a contactless integrated circuit (IC) tag attached thereto, an arrangement may be made where the delivery management unit 12 is notified that the package i has been loaded to the locker j by bringing the loading worker's terminal 3 into proximity with a contactless chip or the like.

Next, when the unmanned delivery vehicle 2c draws near to the delivery destination of the package i, the delivery management unit 12 transmits management information instructing the locker j to be moved to the unloading position orientation and height for the package i that has been determined, to the communication unit 21 of the unmanned delivery vehicle 2c.

Next, the control unit 22 of the unmanned delivery vehicle 2c controls the crane moving mechanism unit 25 following the management information from the communication unit 21, and the crane moving mechanism unit 25 moves the locker j containing the package i to the orientation and height of the unloading position of the package i that has been determined.

Finally, the communication unit 21 of the unmanned delivery vehicle 2c notifies the recipient's terminal 4 (see FIG. 1) of the recipient R2 to the effect that the package i has arrived, and of the orientation and height of the unloading position of the package i that has been determined, and the recipient's terminal 4 makes a display to the effect that the package i has arrived, and of the orientation and height of the unloading position of the package i. The recipient R2 unloads the package i following the display of the recipient's terminal 4. Note that an image taking device such as a camera or the like may be installed in the unmanned delivery vehicle 2c, and change the orientation and/or height of the determined unloading position in accordance with surrounding conditions, such as obstructions such as other parked vehicles or the like.

As described above, the lockers LC of the unmanned delivery vehicle 2c illustrated in FIGS. 26 and 27 are movable, so the loading positions of packages at the time of loading can be optional. The lockers LC, i.e., packages are moved to one of the package unloading openings 24L, 24R, and 24B by the time of reception, and the orientations of unloading position of the packages are changed, and also the lockers LC, i.e., the packages are moved to one of the upper tier, middle tier, and lower tier, following the management information that the position determining device 1 has determined as described above, thereby changing the height of the package unloading position. Moving of packages preferably is completed by the time of reception.

As described above, in the unmanned delivery vehicle 2c illustrated in FIGS. 26 and 27, management information is acquired from the position determining device 1, and lockers LC are moved to one of the unloading opening 24L at the left side, the unloading opening 24R at the right side, and the unloading opening 24B at the rear side, and also moved to one of the upper tier, middle tier, and lower tired, so that the orientation and height of package unloading positions are arranged in accordance with the management information. Accordingly, the orientation of the unloading position can be automatically arranged to face an orientation and height appropriate for the stopping position attributes and a height appropriate for the recipient attributes. When delivering packages using the unmanned delivery vehicle 2c, the recipient can easily unload packages from the orientation of the package unloading position appropriate for the reception site of the package (unloading opening 24L at the left side, unloading opening 24R at the right side, or unloading opening 24B at the rear side) at a package unloading position height appropriate for own properties.

Third Embodiment

In the present embodiment, an unmanned delivery vehicle having ranging sensors is used, and orientation appropriateness and height appropriateness are dynamically changed when operating the unmanned delivery vehicle. The configuration of the position determining system according to the present embodiment is the same as the position determining system illustrated in FIG. 1 except for the unmanned delivery vehicle, so illustration and detailed description will be omitted, and only points differing from the first embodiment will be described in detail.

Figure 28:
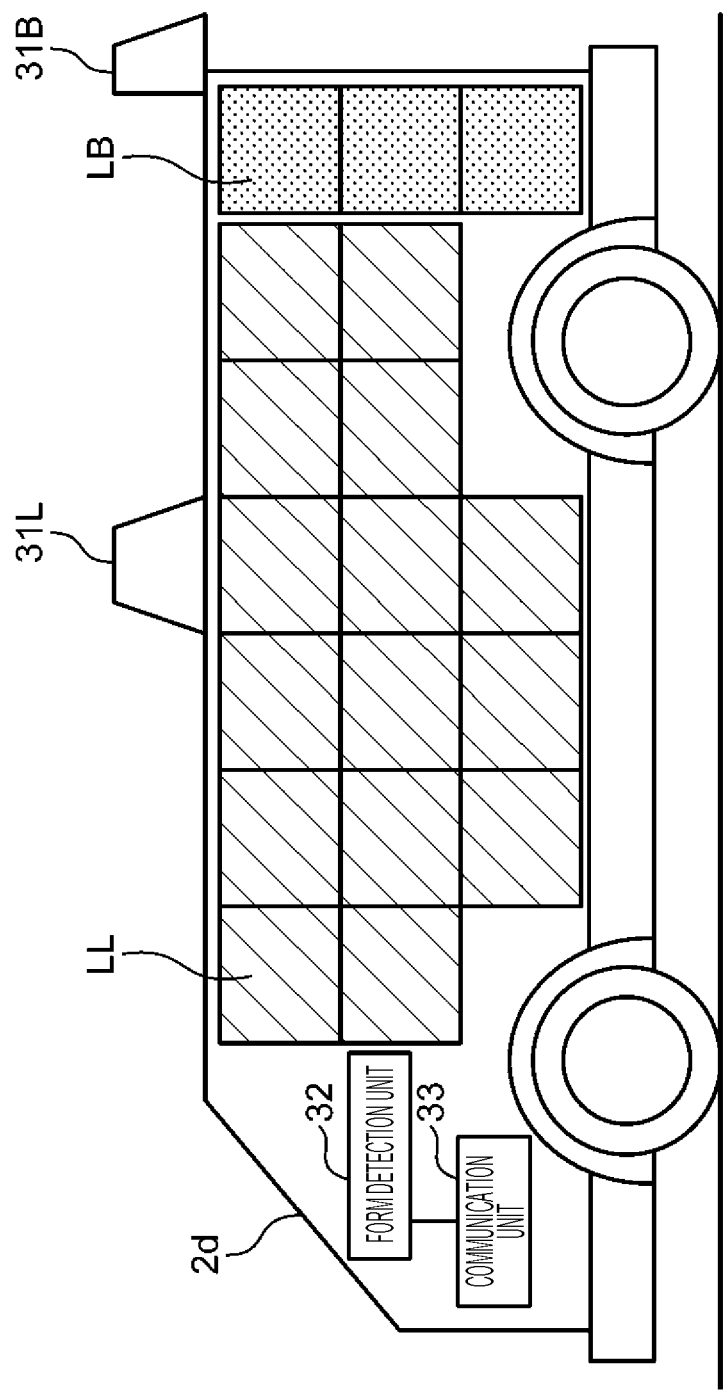
FIG. 28 is a left-side view illustrating an example of the configuration of an unmanned delivery vehicle used in a position determining system according to a third embodiment of the present disclosure.
Figure 29:
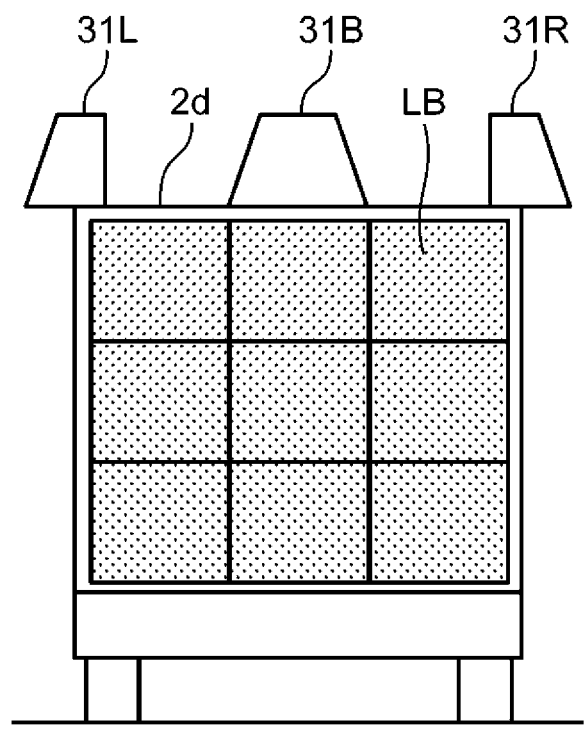
FIG. 29 is a rear-side view illustrating a layout example of ranging sensors at the rear side of an unmanned delivery vehicle illustrated in FIG. 28.
Figure 30:
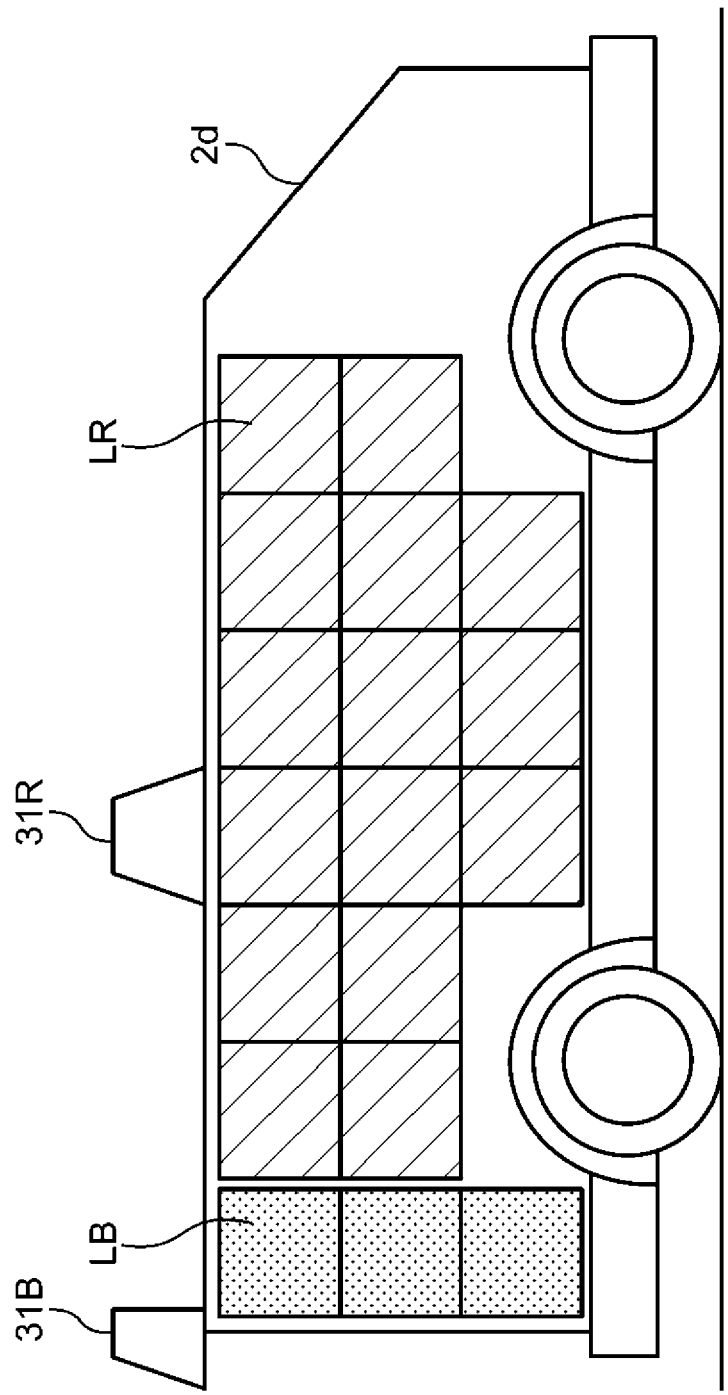
FIG. 30 is a right-side view illustrating a layout example of ranging sensors at the right side of the unmanned delivery vehicle illustrated in FIG. 28.

FIG. 28 is a left-side view illustrating an example of the configuration of an unmanned delivery vehicle used in a position determining system according to a third embodiment of the present disclosure, FIG. 29 is a rear-side view illustrating a layout example of ranging sensors at the rear side of an unmanned delivery vehicle illustrated in FIG. 28, and FIG. 30 is a right-side view illustrating a layout example of ranging sensors at the right side of the unmanned delivery vehicle illustrated in FIG. 28.

The unmanned delivery vehicle 2d illustrated in FIGS. 28 through 30 has a left-side ranging sensor 31L, a rear-side ranging sensor 31B, a right-side ranging sensor 31R, a form detection unit 32, and a communication unit 33, and other configurations are the same as the unmanned delivery vehicle 2 according to the first embodiment, so points of difference will be described below.

The left-side ranging sensor 31L is disposed at the middle upper portion on the left side face of the unmanned delivery vehicle 2d where multiple lockers LL are arrayed. The rear-side ranging sensor 31B is disposed at the middle upper portion on the rear side face of the unmanned delivery vehicle 2d where multiple lockers LB are arrayed. The right-side ranging sensor 31R is disposed at the middle upper portion on the right side face of the unmanned delivery vehicle 2d where multiple lockers LR are arrayed.

The left-side ranging sensor 31L, rear-side ranging sensor 31B, and right-side ranging sensor 31R are scanning light wave ranging meters that measure physical shape data in the space around the unmanned delivery vehicle 2d, made up of laser scanners or the like, for example.

When the unmanned delivery vehicle 2d reaches a delivery destination, the left-side ranging sensor 31L acquires physical form data of the space to the left side around the unmanned delivery vehicle 2d, and outputs to the form detection unit 32. The rear-side ranging sensor 31B also acquires physical form data of the space to the rear side around the unmanned delivery vehicle 2d, and outputs to the form detection unit 32. The right-side ranging sensor 31R also acquires physical form data of the space to the right side around the unmanned delivery vehicle 2d, and outputs to the form detection unit 32.

The form detection unit 32 detects large protruding/recessed portions (protruding portions or recessed portions) of a predetermined value or greater in the pavement to the left side, right side, and behind the unmanned delivery vehicle 2d, that could impede unloading packages from the lockers, based on the form data acquired from the left-side ranging sensor 31L, rear-side ranging sensor 31B, and right-side ranging sensor 31R, and outputs protruding/recessed portion data indicating detected protruding/recessed portions to the communication unit 33. Note that the protruding/recessed portion data includes information indicating the address of the delivery destination, and orientation information of left side, right side, or rear side.

For example, the form detection unit 32 detects guardrails as protruding portions, detects ditches as recessed portions, and so forth. Note that it is sufficient for the form data and protruding/recessed portion data to be data from which it can be understood that there are large protruding/recessed portions to the left side, right side, or rear side, and that this does not have to be data identifying what these are.

The communication unit 33 is communicably connected to the position determining device 1 (see FIG. 1) via a predetermined wireless network (omitted from illustration), and transmits the protruding/recessed portion data of the left side, right side, and rear side, to the position determining device 1.

The delivery management unit 12 of the position determining device 1 receives the protruding/recessed portion data from the unmanned delivery vehicle 2d, and inputs to the input unit 110. The input unit 110 correlates the protruding/recessed portion data from the unmanned delivery vehicle 2d with the address (delivery destination address) and stores in the stopping position attributes table in the stopping position attributes database 113.

In a case where protruding/recessed data is stored correlated with the delivery destination address when calculating the orientation appropriateness referencing the stopping position attributes table in the stopping position attributes database 113, the orientation appropriateness table calculating unit 116 lowers the orientation appropriateness for the unloading orientation matching the orientation in which the protruding/recessed data has been detected to "0.0" for example, and changes the orientation appropriateness in the address/orientation appropriateness table illustrated in FIG. 13.

Accordingly, in a case where the unmanned delivery vehicle 2d detects large protruding/recessed portions at the delivery destination, and the unmanned delivery vehicle 2d or another unmanned delivery vehicle delivers packages to the same delivery destination at a later time, the orientation appropriateness table calculating unit 116 judges that lockers situated in the orientation where there are large protruding/recessed portions are inappropriate, and can reduce the orientation appropriateness for the orientation in which the protruding/recessed data has been detected.

Also, when the recipient unloads a package from a locker, the form detection unit 32 outputs to the communication unit 33 data of the height of the recipient (including recipient identification information) indicating the detected height of the recipient, based on form data acquired from the left-side ranging sensor 31L, rear-side ranging sensor 31B and right-side ranging sensor 31R. The communication unit 33 transmits the recipient height data to the position determining device 1. Now, the height of the recipient is the apparent height, not the stature of the recipient, since there are cases where the recipient is in a wheelchair, or has a bent back or the like.

For example, in a case where the recipient is in a wheelchair, the form detection unit 32 detects the height to the head of the recipient in the state of being seated in the wheelchair, or if the recipient is aged and bent forward with a bent back, detects the height to the head. Note that it is sufficient for the form data and the recipient height data to be data from which the height of the recipient can be detected, and there is no need to be data that enables what sort of state the recipient is in to be recognized.

The delivery management unit 12 of the position determining device 1 receives the recipient height data from the unmanned delivery vehicle 2d, and outputs to the input unit 110. The input unit 110 stores the recipient height data from the unmanned delivery vehicle 2d in the recipient attributes table in the recipient attributes database 115 correlated with the recipient (recipient identification information).

When calculating height appropriateness by referencing the recipient attributes table and so forth in the recipient attributes database 115, in a case where recipient height data has been stored in a correlated manner, the height appropriateness table calculating unit 117 lowers the height appropriateness of lockers at a height higher than the height indicated by the recipient height data, i.e., higher than the recipient, to a predetermined value, "0.0" for example, and changes the height appropriateness in the recipient/height appropriateness table illustrated in FIG. 17.

Accordingly, in a case where the unmanned delivery vehicle 2d detects the height of the recipient at the delivery destination, and subsequently the unmanned delivery vehicle 2d or another unmanned delivery vehicle delivers a package to the same recipient, the height appropriateness table calculating unit 117 can determine that a locker higher than the height of the recipient is inappropriate for receiving, and can lower the height appropriateness of the locker height for lockers higher than the height of the recipient.

According to the above-described configuration, the orientation appropriateness can be dynamically changed in operation in the present embodiment, so the recipient can easily unload packages from a locker at an orientation appropriate for receiving. Also, the height appropriateness can be dynamically changed in operation, so the recipient can easily unload packages from a locker at a height appropriate for receiving.

Note that while the left-side ranging sensor 31L and so forth has been added to the left side of the unmanned delivery vehicle 2 according to the first embodiment, this example is not particularly restrictive. For example, the left-side ranging sensor 31L, rear-side ranging sensor 31B, right-side ranging sensor 31R, and so forth, may be added to the unmanned delivery vehicles 2b or 2c according to the second embodiment.

In this case, the unmanned delivery vehicles 2b or 2c can move the package to an unloading opening at an orientation other than the orientation where the large protruding/recessed portion has been detected by the left-side ranging sensor 31L, rear-side ranging sensor 31B, or right-side ranging sensor 31R, so the recipient can easily unload the package from an unloading opening appropriate for receiving the package. Also, the unmanned delivery vehicle 2c can move the package to a height lower than the height of the recipient detected by the left-side ranging sensor 31L, rear-side ranging sensor 31B, right-side ranging sensor 31R, so the recipient can easily unload the package from a height appropriate for the height of the recipient.

Fourth Embodiment

In a fourth embodiment, a unmanned delivery vehicle that has switches operated by the recipient is used, and the orientation appropriateness and height appropriateness is dynamically changed when operating the unmanned delivery vehicle. The configuration of the position determining system according to the present embodiment is the same as the position determining system illustrated in FIG. 1 except for the unmanned delivery vehicle, so illustration and detailed description will be omitted, and only points differing from the first embodiment will be described in detail.

Figure 31:
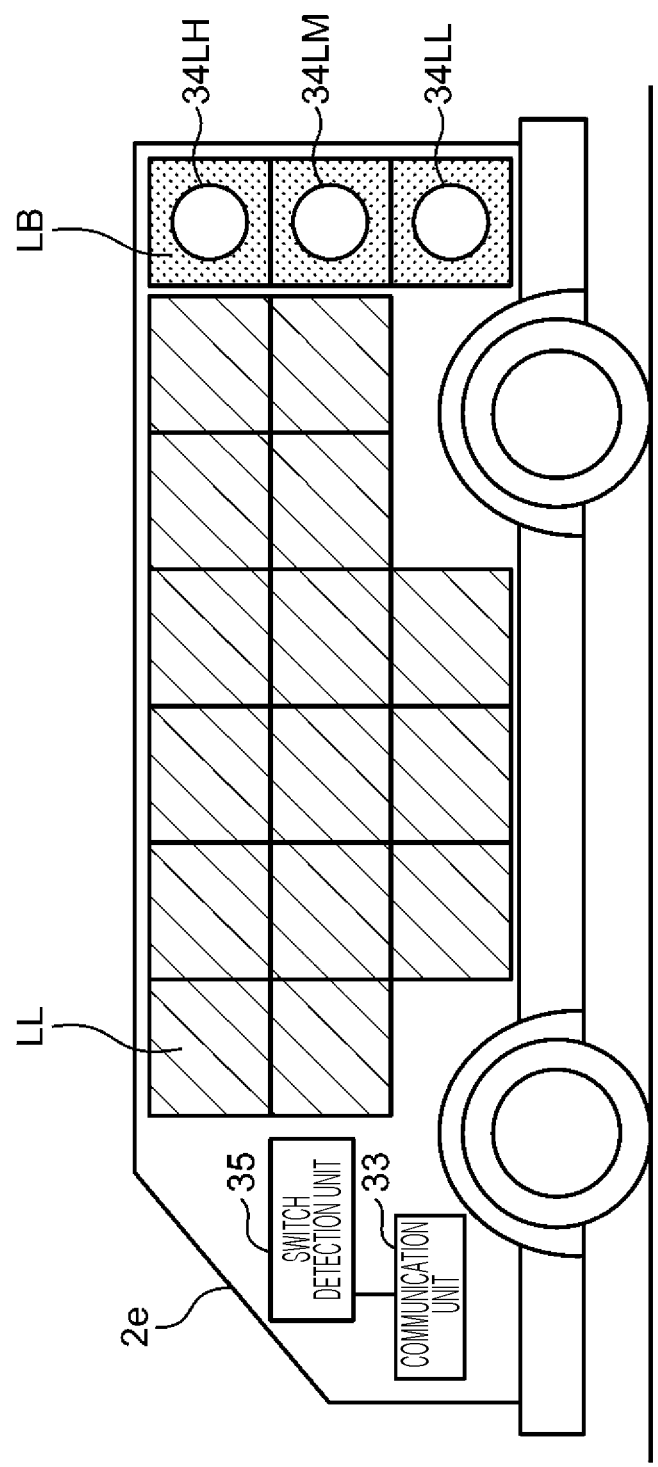
FIG. 31 is a left-side face view illustrating an example of the configuration of an unmanned delivery vehicle used in a position determining system according to a fourth embodiment of the present disclosure.
Figure 32:
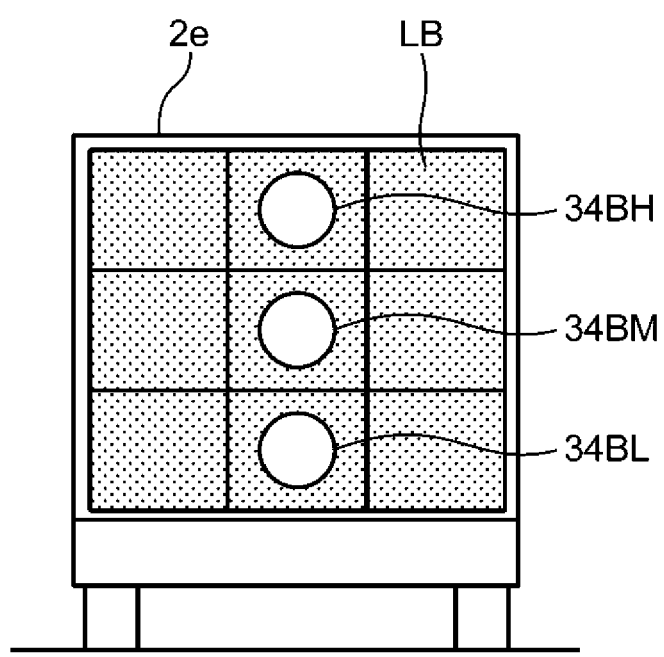
FIG. 32 is a rear-side view illustrating a layout example of switches at the rear side of an unmanned delivery vehicle illustrated in FIG. 31.
Figure 33:
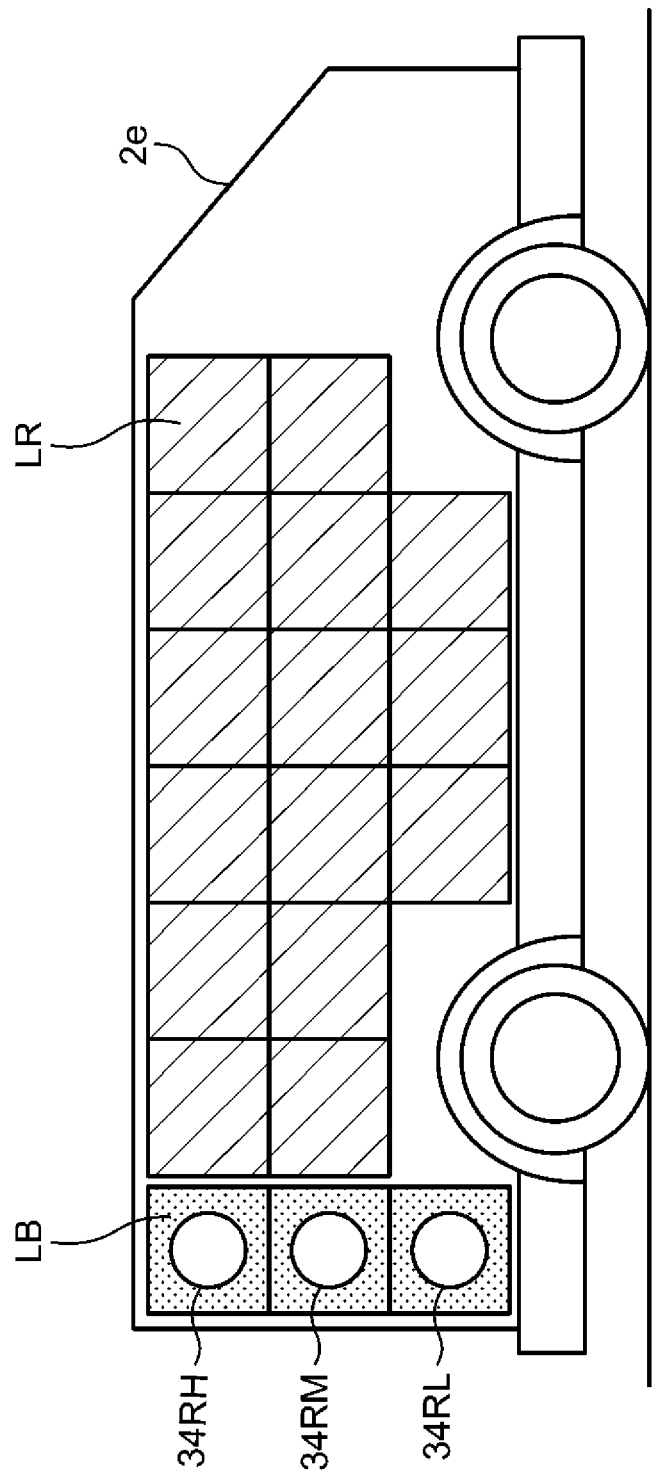
FIG. 33 is a right-side view illustrating a layout example of switches at the right side of an unmanned delivery vehicle illustrated in FIG. 31.

FIG. 31 is a left-side face view illustrating an example of the configuration of an unmanned vehicle used in a position determining system according to a fourth embodiment of the present disclosure, FIG. 32 is a rear-side view illustrating a layout example of switches at the rear side of the unmanned delivery vehicle illustrated in FIG. 31, and FIG. 33 is a right-side view illustrating a layout example of switches at the right-side face of an unmanned delivery vehicle illustrated in FIG. 31.

An unmanned delivery vehicle 2e illustrated in FIGS. 31 through 33 has three switches 34LH, 34LM, and 34LL at the left side, three switches 34BH, 34BM, and 34BL at the rear side, three switches 34RH, 34RM, and 34RL at the right side, a switch detecting unit 35, and the communication unit 33, and other configurations are the same as the unmanned delivery vehicle 2 according to the first embodiment, so points of difference will be described below.

The switches 34LH, 34LM, and 34LL are installed at the upper tier, middle tier, and lower tier toward the rear side of the left side face of the unmanned delivery vehicle 2e where the multiple lockers LL are arrayed (on the side face side of the rear side lockers LB). The switches 34BH, 34BM, and 34BL are installed at the upper tier, middle tier, and lower tier at the middle portion of the rear face of the of the unmanned delivery vehicle 2e where the multiple lockers LB are arrayed. The switches 34RH, 34RM, and 34RL are installed at the upper tier, middle tier, and lower tier toward the rear side of the right side face of the unmanned delivery vehicle 2e where the multiple lockers LR are arrayed (on the side face side of the rear side lockers LB).

Accordingly, a total of nine switches 34LH through 34RL are arrayed at the upper tier, middle tier, and lower tier positions at each of the left side, right side, and rear side of the unmanned delivery vehicle 2e, and the recipient can press a switched specifying a locker of an orientation and height where receiving the package is the easiest. Note that the number and arrangement and so forth of the switches is not restricted to the above example in particular, and various types of modifications can be made as long as the recipient can selected a locker from which it is easy to receive.

Specifically, when the unmanned delivery vehicle 2e arrives at the delivery destination and the recipient receives the package, if the locker at the unloading position is difficult to unload from, the recipient presses a switch out of the nine switches 34LH through 34RL to instruct a locker of the orientation and height where it is easiest to unload the package.

For example, in a case where a locker at the middle tier to the left side is a locker of an orientation and height where it is easiest to receive the package, the recipient presses the switch 34LM. At this time, the switch 34LM transmits switch-on data indicating that the recipient has selected the switch 34LM to the switch detecting unit 35. Upon receiving the switch-on data from the switch 34LM, the switch detecting unit 35 outputs switch data indicating that the recipient has selected a locker at the middle tier to the left side to the communication unit 33.

The other switches also operate in the same way as the switch 34LM, and the switch detecting unit 35 outputs the switch data indicating the orientation and height of the locker that the recipient has selected to the communication unit 33.

The communication unit 33 is communicably connected to the position determining device 1 (see FIG. 1) via a predetermined wireless network (omitted from illustration), and transmits switch data indicating the orientation and height of the locker that the recipient has selected to the position determining device 1. Note that the switch data includes information indicating the delivery destination address, recipient identification information, orientation data indicating the orientation of the locker that the recipient has selected, and height data indicating the height of the locker that the recipient has selected.

The delivery management unit 12 of the position determining device 1 receives the switch data from the unmanned delivery vehicle 2e and outputs to the input unit 110. The input unit 110 stores orientation data in the switch data from the unmanned delivery vehicle 2e in the stopping position attributes table in the stopping position attributes database 113 in a manner correlated with the address (delivery destination address).

When referencing the stopping position attributes table in the stopping position attributes database 113 and so forth to calculate the orientation appropriateness, in a case where orientation data is correlated with the delivery destination address and stored, the orientation appropriateness table calculating unit 116 raises the orientation appropriateness of the unloading orientation matching the orientation indicated by the orientation data to a predetermined value, e.g., "1.0", and changes the orientation appropriateness in the address/orientation appropriateness table illustrated in FIG. 13. Note that the method of changing the orientation appropriateness is not particularly restricted to the above example. For example, the orientation appropriateness before changing may be raised by a predetermined rate with the maximum value of "1.0".

Accordingly, information regarding a locker orientation that is convenient for the recipient to receive, can be acquired by the unmanned delivery vehicle 2e accepting the switch operations by the recipient at the delivery destination. In a case where the unmanned delivery vehicle 2e or another unmanned delivery vehicle subsequently delivers a package to the same delivery destination, the orientation appropriateness table calculating unit 116 can raise the orientation appropriateness so that a locker orientation convenient for the recipient to receive from is selected with priority.

Also, the input unit 110 stores height data from the switch data from the unmanned delivery vehicle 2e in the recipient attributes table in the recipient attributes database 115, in correlation with the recipient (recipient identification information).

At the time of calculating the height appropriateness by referencing the recipient attributes table in the recipient attributes database 115 or the like, and there is height data stored in a correlated manner, the height appropriateness table calculating unit 117 raises the height appropriateness of the locker height matching the height that the height data indicates to a predetermined value, "1.0" for example, and changes the height appropriateness in the recipient/height appropriateness information illustrated in FIG. 17. Note that the method of changing the height appropriateness is not restricted to the above example in particular. For example, the height appropriateness before changing may be raised by a predetermined rate with the maximum value of "1.0".

Accordingly, information of the height of a locker that is convenient for the recipient to receive from can be acquired by the unmanned delivery vehicle 2e accepting the switch operations from the recipient at the delivery destination. In a case where the unmanned delivery vehicle 2e or another unmanned delivery vehicle subsequently delivers a package to the same recipient, the height appropriateness table calculating unit 117 can raise the height appropriateness so that a locker height convenient for the recipient to receive from is selected with priority.

According to the above configuration, the orientation appropriateness can be dynamically changed at the time of operation, so the recipient can easily unload a package from a locker of an orientation appropriate for receiving. Further, the height appropriateness can be dynamically changed at the time of operation, so the recipient can easily unload a package from a locker of a height appropriate for receiving.

Note that the switch 34LH and so forth have been added to the unmanned delivery vehicle 2 according to the first embodiment in the present embodiment, but this example is not restrictive in particular. For example, the switches 34LH, 34LM, and 34LL at the left side, switches 34BH, 34BM, and 34BL at the rear side, and switches 34RH, 34RM, and 34RL at the right side, and so forth, may be added to the unmanned delivery vehicles 2b and 2c according to the second embodiment.

In this case, information of the orientation and height of a locker from which it is convenient for the recipient to receive from can be acquired by the unmanned delivery vehicles 2b and 2c accepting the switch operations from the recipient at the delivery destination. Accordingly, the unmanned delivery vehicle 2b can enable the recipient to receive a package from an unloading opening at an orientation appropriate for receiving the package, by moving the package to the receiving opening situated at an orientation convenient for the recipient to receive from. Also, the unmanned delivery vehicle 2c can enable the recipient to receive a package from an unloading opening at an orientation appropriate for receiving the package at a height appropriate to receive the package from, by moving the package to the receiving opening situated at an orientation convenient for the recipient to receive from and at a height convenient to receive the package from.

What is claimed is:

1. A device comprising:
   a processor; and
   memory storing a computer program that causes the processor to perform operations including
   (A) acquiring an address indicating a delivery destination of a package, and first attribute information indicating an attribute of a stopping position where an autonomous vehicle delivering the package stops at the delivery destination, the autonomous vehicle including a moving mechanism that moves the package,
   (B) determining an unloading side of the autonomous vehicle among a plurality of sides of the autonomous vehicle, to change the unloading side of the autonomous vehicle based on the address and the first attribute information, wherein the package is unloaded from the determined unloading side of the autonomous vehicle, and
   (C) transmitting, to the autonomous vehicle, management information correlating identification information for identifying the package and the determined unloading side, to cause the autonomous vehicle to control the moving mechanism so that an orientation of unloading position of the package is set in accordance with the management information to unload the package from the determined unloading side of the autonomous vehicle.

2. The device according to claim 1,
   wherein the first attribute information includes
   traffic amount information relating to an amount of traffic at the stopping position,
   lane count information relating to a count of lanes of a road at the stopping position,
   stopping orientation information relating to a stopping orientation of the autonomous vehicle, and/or
   obstruction information relating to an obstruction around the stopping position.

3. The device according to claim 1,
   wherein the first attribute information includes traffic amount information relating to an amount of traffic at the stopping position, and
   the (B) includes determining, in a case where the amount of traffic at the stopping position is heavier than a predetermined amount, a side of the autonomous vehicle that is opposite from a center line of the road where the autonomous vehicle is stopped as being the unloading side.

4. The device according to claim 1,
   wherein the first attribute information includes lane count information relating to a count of lanes of a road at the stopping position, and
   the (B) includes determining, in a case where the count of the lanes of the road at the stopping position is two or more on each side of the road, a side of the autonomous vehicle that is closer to an edge of the road as being the unloading side.

5. The device according to claim 1,
   wherein the first attribute information includes stopping orientation information relating to a stopping orientation of the autonomous vehicle, and
   the (B) includes determining, in a case where the stopping orientation is backwards, a rear side of the autonomous vehicle as being the unloading side.

6. The device according to claim 1,
   wherein the first attribute information includes obstruction information relating to an obstruction around the stopping position, and
   the (B) includes determining, in a case where there is an obstruction around the stopping position, a side where there is no obstruction as being the unloading side.

7. The device according to claim 1,
   wherein the (B) includes
   calculating a value indicating ease of unloading the package at each of the plurality of sides of the autonomous vehicle, based on the address and the first attribute information, and
   determining the unloading side based on the value at each of the plurality of sides.

8. The device according to claim 1,
   wherein the operations further include
   (D) acquiring second attribute information indicating an attribute of a recipient of the package,
   (E) determining a height of an unloading position where the package is unloaded from the autonomous vehicle at the delivery destination, based on the second attribute information, and further correlating the determined height with the identification information in the (C).

9. The device according to claim 8,
wherein the second attribute information includes
height information relating to a height of the recipient,
age information relating to the age of the recipient, and/or
handicap information relating to whether the recipient is handicapped or not.

10. The device according to claim 8,
wherein the second attribute information includes height information relating to a height of the recipient, and
the (E) includes determining, in a case the height of the recipient is lower than a predetermined value, the height of the unloading position to be lower than a predetermined height.

11. The device according to claim 8,
wherein the second attribute information includes age information relating to an age of the recipient, and
the (E) includes determining, in a case the age of the recipient is higher than a predetermined value, the height of the unloading position to be lower than a predetermined height.

12. The device according to claim 8,
wherein the second attribute information includes handicap information relating to whether the recipient is handicapped or not, and
the (E) includes determining, in a case the recipient is handicapped, the height of the unloading position to be lower than a predetermined height.

13. The device according to claim 8,
wherein the (E) includes
calculating a value indicating ease of unloading the package at each of heights of a plurality of unloading positions, based on the second attribute information, and
determining the height of the unloading position, based on the value at each of the height.

14. The device according to claim 8,
wherein the (B) includes
calculating a first value indicating ease of unloading the package at each of the plurality of sides of the autonomous vehicle, based on the address and the first attribute information, and
determining the unloading side based on the first value at each of the plurality of sides, and
the (E) includes
calculating a second value indicating ease of unloading the package at each of heights of the plurality of unloading positions provided to the autonomous vehicle, based on the second attribute information, and
determining the height of the unloading position, based on the second value at each of the heights.

15. An autonomous vehicle from which the package can be unloaded from a plurality of unloading positions, the autonomous vehicle comprising:
the moving mechanism that moves the package; and
a controller that acquires the management information from the device according to claim 1, and controls the moving mechanism so that the orientation of unloading position of the package is set in accordance with the management information.

16. The autonomous vehicle according to claim 15,
wherein the moving mechanism includes an orientation changing mechanism that changes the orientation of the unloading position of the package.

17. The autonomous vehicle according to claim 15,
wherein the moving mechanism includes a height changing mechanism that changes the height of the unloading position of the package.

18. A method, comprising:
(A) acquiring an address indicating a delivery destination of a package, and first attribute information indicating an attribute of a stopping position where an autonomous vehicle delivering the package stops at the delivery destination, the autonomous vehicle including a moving mechanism that moves the package;
(B) determining an unloading side of the autonomous vehicle among a plurality of sides of the autonomous vehicle, to change the unloading side of the autonomous vehicle based on the address and the first attribute information, wherein the package is unloaded from the determined unloading side of the autonomous vehicle; and
(C) transmitting, to the autonomous vehicle, management information in which identification information for identifying the package is associated with the determined unloading side, to cause the autonomous vehicle to control the moving mechanism so that the orientation of unloading position of the package is set in accordance with the management information to unload the package from the determined unloading side of the autonomous vehicle.

19. A system, comprising:
the autonomous vehicle from which a package can be unloaded from a plurality of unloading positions; and
the device according to claim 1,
wherein the autonomous vehicle includes
the moving mechanism that moves the package, and
a controller that acquires the management information from the device, and controls the moving mechanism so that the orientation of unloading position of the package is set in accordance with the management information.

20. The device according to claim 1, wherein
the autonomous vehicle includes at least left and right sides with respect to the forwarding direction of the autonomous vehicle,
one of the left and right sides is determined as the unloading side such that the determined one of the left and right sides of the autonomous vehicle is farther from an edge of a road than the other of the left and right sides.

* * * * *